(12) United States Patent
Yousefiani et al.

(10) Patent No.: US 10,926,480 B2
(45) Date of Patent: Feb. 23, 2021

(54) METHODS FOR MANUFACTURING COMPONENTS HAVING SPATIALLY GRADED PROPERTIES

(71) Applicant: The Boeing Company, Chicago, IL (US)

(72) Inventors: Ali Yousefiani, Tustin, CA (US); Bruno Zamorano Senderos, Huntsville, AL (US); Peter J. Bocchini, Huntsville, AL (US); Dennis L. Coad, Madison, AL (US)

(73) Assignee: The Boeing Company, Chicago, IL (US)

( * ) Notice: Subject to any disclaimer, the term of this patent is extended or adjusted under 35 U.S.C. 154(b) by 171 days.

(21) Appl. No.: 15/833,177

(22) Filed: Dec. 6, 2017

(65) Prior Publication Data

US 2019/0070789 A1 Mar. 7, 2019

Related U.S. Application Data

(60) Provisional application No. 62/554,199, filed on Sep. 5, 2017.

(51) Int. Cl.
*B29C 65/06* (2006.01)
*B23K 35/00* (2006.01)
(Continued)

(52) U.S. Cl.
CPC .............. *B29C 65/06* (2013.01); *B22F 7/004* (2013.01); *B22F 7/08* (2013.01); *B23K 35/001* (2013.01);
(Continued)

(58) Field of Classification Search
CPC ........ B22F 7/004; B22F 2999/00; B22F 7/08; B22F 5/007; B22F 3/1055; B22F 3/008;
(Continued)

(56) References Cited

U.S. PATENT DOCUMENTS 7,910,219 B1 3/2011 Withers et al.
2017/0189960 A1* 7/2017 Ibe .......................... B22F 1/0014

FOREIGN PATENT DOCUMENTS

EP 0 360 468 3/1990
JP H 10 289 691 10/1998
WO WO-2012128708 A1 * 9/2012 ............. C22C 29/08

OTHER PUBLICATIONS

Pakseresht A.H. et. al; Spark Plasma sintering of a multilayer thermal bather coating on Inconel 738 Superalloy: Microstructural development and hot corrosion behavior; Nov. 10, 2015.*
(Continued)

*Primary Examiner* — Vishal I Patel
(74) *Attorney, Agent, or Firm* — Walters & Wasylyna LLC

(57) ABSTRACT

A method for manufacturing a component having a spatially graded property includes providing a first layer of particulate matter, the first layer having first material characteristics, and providing a second layer of particulate matter, the second layer having second material characteristics different from the first material characteristics. The method further includes providing an interlayer between the first layer and the second layer and heating the first layer, the second layer, and the interlayer to bond the first layer with the second layer.

42 Claims, 23 Drawing Sheets

(51) Int. Cl.
    *B32B 15/01*    (2006.01)
    *B22F 7/08*    (2006.01)
    *B32B 15/16*    (2006.01)
    *B22F 7/00*    (2006.01)
    *B32B 5/30*    (2006.01)
    *B32B 15/00*    (2006.01)
    *B32B 15/02*    (2006.01)
    *B33Y 10/00*    (2015.01)
    *C23C 4/12*    (2016.01)
    *C23C 24/04*    (2006.01)

(52) U.S. Cl.
    CPC ............... *B32B 5/30* (2013.01); *B32B 15/00* (2013.01); *B32B 15/01* (2013.01); *B32B 15/02* (2013.01); *B32B 15/16* (2013.01); *B33Y 10/00* (2014.12); *C23C 4/12* (2013.01); *C23C 24/04* (2013.01); *B22F 2999/00* (2013.01)

(58) Field of Classification Search
    CPC ......... C23C 24/04; C23C 4/12; B23K 35/001; B32B 5/30; B32B 15/00; B32B 15/01; B32B 15/02; B32B 15/16; B29C 65/06; B33Y 10/00
    See application file for complete search history.

(56) References Cited

OTHER PUBLICATIONS

Panda et al: "Titanium-titanium boride (Ti-TiB) functionally graded materials through reaction sintering: Synthesis, microstructure and properties," Metallurgical and Materials Transactions A, vol. 34, No. 9, p. 1993-2003 (Sep. 2003).

Pakseresht et al: "Spark plasma sintering of a multilayer thermal barrier coating on Iconel 738 superalloy: Microstructural development and hot corrosion behavior," Ceramics International, Elsevier, vol. 42, No. 2, p. 2770-2779 (Nov. 10, 2015).

Chin, "Army focused research team on functionally graded armor composites", Materials Science and Engineering: A 259.2, pp. 155-161 (1999).

Yang et al., "A Study on Propagation Characteristic of One-dimensional Stress Wave in Functionally Graded Armor Composites", Journal of Physics: Conference Series vol. 419, No. 1 (2013).

Jerusalem et al., "Grain size gradient length scale in ballistic properties optimization of functionally graded nanocrystalline steel plates", Scripta Materialia, vol. 69, Issues 11-12, pp. 773-776, (Dec. 2013).

Gupta et al., "Ballistic Studies on $TiB_2$-$Ti$ Functionally Graded Armor Ceramics", Defence Science Journal, vol. 62, No. 6, pp. 382-389 (Nov. 2012).

\* cited by examiner

METHODS FOR MANUFACTURING COMPONENTS HAVING SPATIALLY GRADED PROPERTIES

PRIORITY

This application is a nonprovisional of, and claims priority from, U.S. Ser. No. 62/554,199 filed on Sep. 5, 2017.

FIELD

This application relates to methods for manufacturing components having spatially graded properties, and, more particular, methods for manufacturing components having spatially graded properties from particulate matter.

BACKGROUND

There is increasing demand for components with spatially graded properties for aerospace and other applications, in which properties of the components vary spatially to produce optimized designs with tailored properties. Properties are largely affected by material characteristics, such as composition, microstructure, phase distribution, porosity, etc. Accordingly, components having spatially graded properties have been produced as a result of variations in composition, microstructure, phase distribution, porosity, and other material characteristics.

Examples of components having spatially graded properties include carburized gears and carburized actuators in which a surface of a component is hardened by diffusion of carbon from the surface while a core of the component remains ductile. However, manufacturing of components by such methods is limited.

Other methods for manufacturing components having spatially graded properties have been employed. For example, additive manufacturing of components having spatially graded properties has been employed through laser powder bed and ion/laser powder feed methods. Electrodeposition, thermal spray and other techniques have been used to alter surface properties. Cold spray can be used effectively in some circumstances. Another possibility is to create layers of different materials and then attach the layers together through brazing or use of adhesives.

Those skilled in the art continue with research and developments efforts in the field of manufacturing components having spatially graded properties.

SUMMARY

In one aspect, the disclosed method for manufacturing a component having a spatially graded property includes providing a first layer of particulate matter, the first layer having first material characteristics, and providing a second layer of particulate matter, the second layer having second material characteristics different from the first material characteristics. The method further includes providing an interlayer between the first layer and the second layer and heating the first layer, the second layer, and the interlayer to bond the first layer with the second layer.

In another aspect, the disclosed method for manufacturing a component having a spatially graded property includes providing a first layer of particulate matter, the first layer having first material characteristics, compacting the first layer of particulate matter using a first die having a first surface geometry, providing a second layer of particulate matter, the second layer having second material characteristics different from the first material characteristics, and compacting the second layer of particulate matter using a second die having a second surface geometry different from the first surface geometry.

In yet another aspect, the disclosed method for manufacturing a component having a spatially graded property includes providing a first layer of particulate matter, the first layer having first material characteristics, providing a second layer of particulate matter on the first layer, the second layer of particulate matter having second material characteristics different from the first material characteristics, and heating the first layer and the second layer at a first temperature to bond the first layer with the second layer. The method further includes providing a third layer of particulate matter, the third layer having third material characteristics, providing a fourth layer of particulate matter on the third layer, the fourth layer having fourth material characteristics different from the first, second, and third material characteristics, and heating the third layer and the fourth layer at a second temperature to bond the third layer with the fourth layer, wherein the second temperature is different than the first temperature. The method further includes joining the bonded first layer and second layer with the bonded third layer and fourth layer.

In yet another aspect, the disclosed method for manufacturing a component having a spatially graded property includes providing a first layer of particulate matter, the first layer having first material characteristics, providing a second layer of particulate matter on the first layer, the second layer having second material characteristics different from the first material characteristics, providing a non-particulate material within or adjacent to at least one of the first layer of particulate matter and the second layer of particulate matter, and heating the first layer, the second layer, and the non-particulate material to bond the first layer with the second layer.

Other aspects of the disclosed methods for manufacturing components having spatially graded properties will become apparent from the following description, the accompanying drawings and the appended claims.

DETAILED DESCRIPTION

Figure 1:
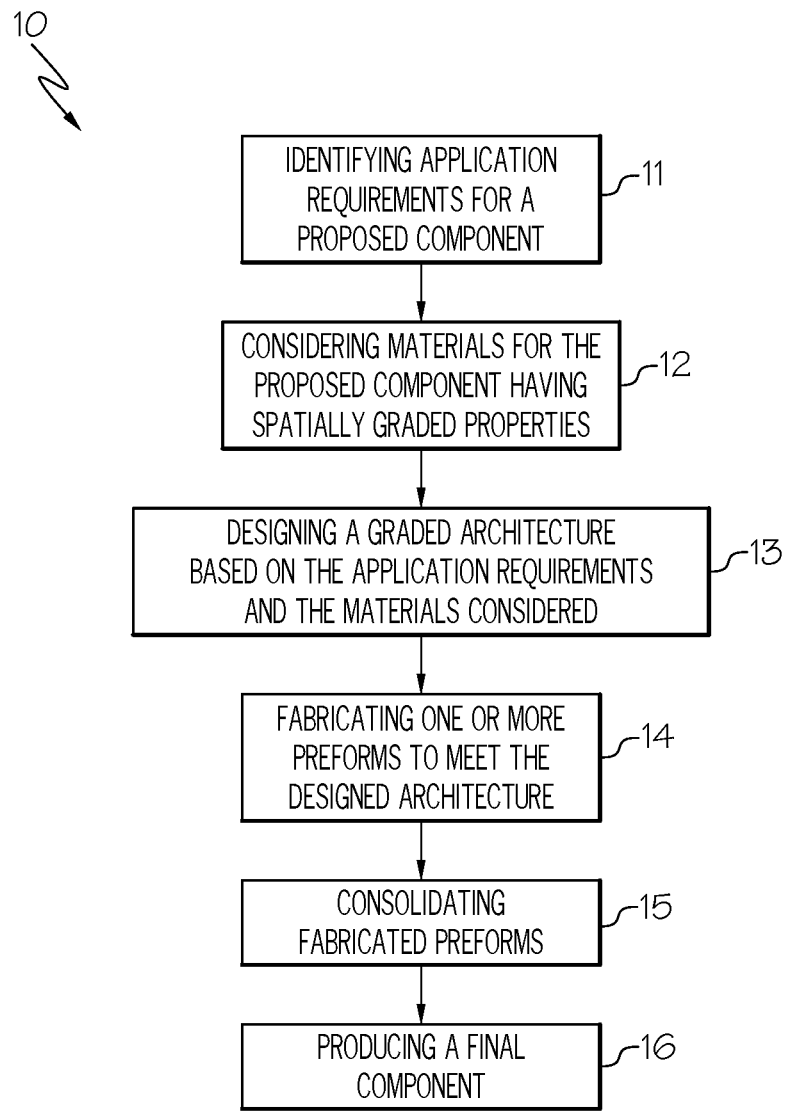
FIG. 1 is flow diagram representing an approach for manufacturing components having spatially graded properties from particulate matter.

As illustrated in FIG. 1, block 10 represents a non-limiting approach for manufacturing components having spatially graded properties from particulate matter. The methods for manufacturing a component having a spatially graded property of the present description are not limited to operating within the approach of block 10.

Referring to FIG. 1, block 11 includes identifying application requirements for a proposed component. Application requirements may include, for example, electrical requirements (e.g. electrical conductivity), chemical requirements (e.g. corrosion resistance) and mechanical requirements. Mechanical requirements may include, for example, hardness, toughness, thermal expansion coefficient, thermal diffusion coefficient, vacancies diffusion coefficient, yield strength, ultimate tensile strength, strain to failure, density, and creep resistance. The application requirements may include a spatial variation of the application requirements. For example, the application requirements may require one or more requirements at a first portion of a component, and one or more different requirements at a second portion of the component, such that a single material may not satisfy both sets of requirements. Thus, components having spatially graded properties may be considered.

Block 12 includes considering materials for components having spatially graded properties based on the application requirements, including considering potential sources of feedstocks of particulate matter and considering potential sources of non-particulate materials. Properties of materials are largely affected material characteristics, such as composition, microstructure, phase distribution, and therefore various material characteristics of source materials may be considered. In an example, a first material may have potential for satisfying one or more application requirements at a first portion of a component, and a second material may have potential for satisfying one or more application requirements at a second portion of a component. Therefore, the first and second materials may be considered for manufacturing components having spatially graded properties. Material characteristics of feedstocks of particulate matter to be considered may include, for example, composition, microstructure, phase distribution, porosity, morphology and size. Material characteristics of non-particulate materials to be considered may include, for example, composition, microstructure, phase distribution, and porosity.

Block 13 includes designing a graded architecture based on the application requirements and the materials considered. Designing a graded architecture may include, for example, selecting a desired spatial distribution of properties, selecting a desired spatial distribution of materials based on the desired spatial distribution of properties, which may include, for example, selecting a number of layers of particulate matter having differing material characteristics, selecting a size of each layer, selecting for characteristics of an interface between each layer, and selecting material characteristics of each layer the particulate matter to achieve the desired spatial distribution of properties. Designing a graded architecture may include balancing advantages and disadvantages of increasing or decreasing a number of layers of particulate matter. As a number of layers of particulate matter is reduced, an economic advantage is provided but a strength of a boundary region between the layers may be sacrificed. Designing a graded architecture may further include selecting a number, size, shape, and position of any non-particulate materials that may be incorporated into the component to achieve the desired spatial distribution of properties.

Block 14 includes fabricating one or more preforms to meet the designed architecture, including blending of feedstocks of particulate matter. For example, a first feedstock of particulate matter having first material characteristics may satisfy one or more application requirements at a first portion of a component and a second feedstock of particulate matter having second material characteristics may satisfy one or more application requirements at a second portion of a component. The first and second feedstocks may be blended in various ratios and fabricated into one or more preforms according to the designed architecture to gradually transition through multiple layers from the first portion of the component to the second portion of the component.

Block 15 includes consolidating fabricated preforms. Consolidating may include, for example, cold compacting (e.g. cold isostatic pressing) and sintering, hot compacting (e.g. hot isostatic pressing), spark plasma sintering, or combinations thereof. Block 15 may include joining together multiple consolidated preforms or joining other fabricated components, such as conventionally fabricated components, to the consolidated preforms.

Block 16 includes producing a final component from the consolidated preform. Producing final components may include, for example, forming processing (e.g. forging), heat treatments, machining, coating or other surface treatments, and finishing.

The following description provides solutions for fabricating and consolidating preforms, including joining of consolidated preforms with other consolidated preforms or with non-particulate materials, and producing final components therefrom. The solutions provided may apply to meet a variety of applications requirements using a variety of feedstocks of particulate matter arranged in a variety of graded architectures, to yield components having spatially graded properties.

Examples of the following description relate to methods for manufacturing a component having a spatially graded property. The methods include providing a plurality of layers of particulate matter, including at least a first layer of particulate matter having first material characteristics and a second layer of particulate matter having second material characteristics different from the first material characteristics, and heating the plurality of layers of particulate matter to bond the first layer with the second layer.

The plurality of layers of particulate matter may further include, for example, a third layer of particulate matter having third material characteristics, a fourth layer of particulate matter having fourth material characteristics, and any additional numbers of layers of particulate matter having additional material characteristics. The third material characteristics may be the same as or different from the first and second material characteristics. The fourth material characteristics may be the same as or different from the first, second, and third material characteristics. The additional material characteristics may be the same as or different from the preceding material characteristics. In one exemplary aspect, the plurality of layers of particulate matter may include at least three layers that gradually transition from a first layer of particulate matter having first material characteristics selected to satisfy one or more application requirements at a first portion of a component to a final layer having different material characteristics selected to satisfy one or more application requirements at a different portion of a component.

Material characteristics of the particulate matter are not limited and may be selected based on application requirements to yield components having the desired spatial distribution of properties. The characteristics of the particulate matter may include, for example, composition, microstructure, phase distribution, particle morphology, particle size, and porosity. Compositions of the particulate matter are not limited, and may include, for example, pure metals, alloy compositions, intermetallic compositions, mineral compositions, ceramic compositions, polymer compositions and mixtures thereof. Morphologies of the particulate matter are not limited and may include, for example, spherical, flake, platelet, rod, hollow morphologies, or mixtures thereof. Sizes of the particulate matter are not limited and may include, for example, particles in a size range of 1 nm to 1000 μm.

In the context of the present description, when a given layer of particulate matter is stated to have material characteristics different from material characteristics of another layer of particulate matter, the respective layers of particulate matter may have at least one difference in material characteristics. In one aspect, the difference between the respective layers of particulate matter may include a difference in composition. In another aspect, the difference between the respective layers of particulate matter may include a difference in microstructure. In yet another aspect, the difference between the respective layers of particulate matter may include a difference in phase distribution. In yet another aspect, the difference between the respective layers of particulate matter may include a difference in particle morphology. In yet another aspect, the difference between the respective layers of particulate matter may include a difference in particle size. In yet another aspect, the difference between the respective layers of particulate matter may include a difference in porosity.

The layers of particulate matter are not limited by a particular shape or arrangement of the layers. For example, the layers of particulate matter may take the form of any three-dimensional shape and each layer of particulate matter may be arranged with respect to any other layer in any manner. In another example, the layers of particulate matter may take the form of consecutively stacked planar layers.

The heating of the plurality of layers of particulate matter is at least sufficient to bond the first layer of particulate matter with the second layer of particulate matter. As previously stated, various examples may further include providing third, fourth, or additional layers of particulate matter having the same or different material characteristics from preceding layers. The heating of the plurality of layers of particulate matter may be sufficient to bond the second layer with the third layer, the third layer with the fourth layer, and any further additional layers with the preceding layer. The bonding of the layers may function to facilitate a boundary cohesion between the layers, increase a strength of a boundary region, and/or minimize thermal stresses. The bonding of the layers may include, for example, solid state bonding of the layers. Solid state bonding may include, for example, diffusion bonding, brazing, diffusion brazing; soldering, cold welding, explosive welding, friction welding, and ultrasonic welding. The heating of the plurality of layers of particulate matter may further be sufficient to consolidate one or more of the layers of particulate matter.

The heating of the layers of particulate matter may include heating the layers at a determined time and temperature. The time and temperature may depend upon a number of factors, such as application requirements, material characteristics of the particulate matter, and arrangement of the layers of particulate matter or other structures within a preform. The time and temperature may be determined to be at least sufficient to bond the first layer with the second layer, and, when desired, sufficient to bond the second layer with the third layer, the third layer with the fourth layer, and any further additional layers with the preceding layer. A lower temperature of heating may require a higher time of heating, and a high temperature of heating may permit a lower time of heating.

An excessive heating may reduce the intended effect of providing a component with the desired spatial distribution of properties. Accordingly, the heating may be controlled to balance a desire for bonding of the layers to facilitate boundary cohesion with an opposing desire for a distinctive layer boundary between layers to maximize the desired spatial distribution of properties. Thus, in a non-limiting example, the heating may be controlled to provide for a maximum observable boundary region thickness of 500 mil or less. In another non-limiting example, the heating may be controlled to provide for a maximum observable boundary region thickness of 100 mil or less. In yet another non-limiting example, the heating may be controlled to provide for a maximum observable boundary region thickness of 10 mil or less. In yet another non-limiting example, the heating may be controlled to provide for a maximum observable boundary region thickness of 1 mil or less.

As described in further detail below, various examples of the present description include characteristics of an interface between layers of particulate matter. In one aspect, the interface may be the interface between layers of particulate matter in direct contact with each other. In another aspect, the interface may include an interlayer that intervenes between adjacent layers of particulate matter, such as an interlayer foil. In yet another aspect, the interface may be a combination of an interface between layers of particulate matter in direct contact with each other and an interlayer that intervenes between adjacent layers of particulate matter, such as an interlayer mesh. The interface, whether with interlayer, without interlayer or combination of with and without interlayer, may be flat or with simple to complex shape. In a specific example, interlayer may be formed by coating a layer of particulate matter (compacted or uncompacted) prior to the heating step.

The interlayer is provided between layers of particulate matter, such as a first interlayer between a first layer of particulate matter and a second layer of particulate matter. Other examples may include a second interlayer between a second layer of particulate matter and the third layer of particulate matter, a third interlayer between a third layer of particulate matter and the fourth layer of particulate matter, and any additional layers of interlayers between and the additional layer of particulate matter and the preceding layer of particulate matter.

In an aspect, a first type of interlayer, e.g. interlayer foil, interlayer mesh, interlayer coating, etc., between first and second layers of particulate matter, and a second type of interlayer, e.g. interlayer foil, interlayer mesh, interlayer coating, etc., may be between second and third layers of particulate matter or between third or fourth layers of particulate matter.

The interlayer may function to separate layers of particulate matter, to permit a bonding of the separated layers upon heating, or to improve control of a shape of the interface. In an aspect, an interlayer, e.g. interlayer foil, interlayer mesh, interlayer coating, etc., may itself have a spatial distribution of materials characteristics, such as a spatial distribution of composition within the interlayer.

When an interlayer is present, the heating is sufficient to bond together the layers separated by the interlayer. In this case, the bonding of the separated layers may include, for example, a solid state bonding between the interlayer to one or both of the separated layers, a solid state bonding between the separated layers, or combinations thereof.

The methods for manufacturing components having spatially graded properties may include compacting the layers of particulate matter. The layers of particulate matter may be compacted separately or together. The compacting may include cold compacting (e.g. cold uniaxial pressing, cold isostatic pressing, etc.) to produce a green compact or may include hot compacting (e.g. hot uniaxial pressing, hot isostatic pressing, etc.) to partly or fully consolidate the layers of particulate matter. The compacting may occur, for example, before, during, or after the heating to bond the layers of particulate matter.

As stated above, the heating step may include compacting. However, the heating of the layers of particulate matter does not necessitate compacting. In an example, the layers of particulate matter may be heated at atmospheric pressure. In another example, the layers of particulate matter may be heated under vacuum pressure.

Although various examples are illustrated to show compacting by pressing with a die, the present description is not limited to compacting by pressing with a die. Compacting includes applying a pressure with a die, applying a pressurized atmosphere, vibratory compacting, or any other process for compacting a given volume of particulate matter.

In an aspect, the heating of the layers of particulate matter may occur at a temperature below a lowest melting point of the materials to avoid melting. In another aspect, the layers of particulate matter may be rapidly heated above a melting point followed by rapid cooling, such as by a localized heating process. In a specific example, the heating may include spark plasma sintering.

Although various examples are described below starting with FIG. 2, modifications may occur to those skilled in the art upon reading the specification. The present description includes such modifications and the present disclosure is limited only by the scope of the claims.

Figure 2:
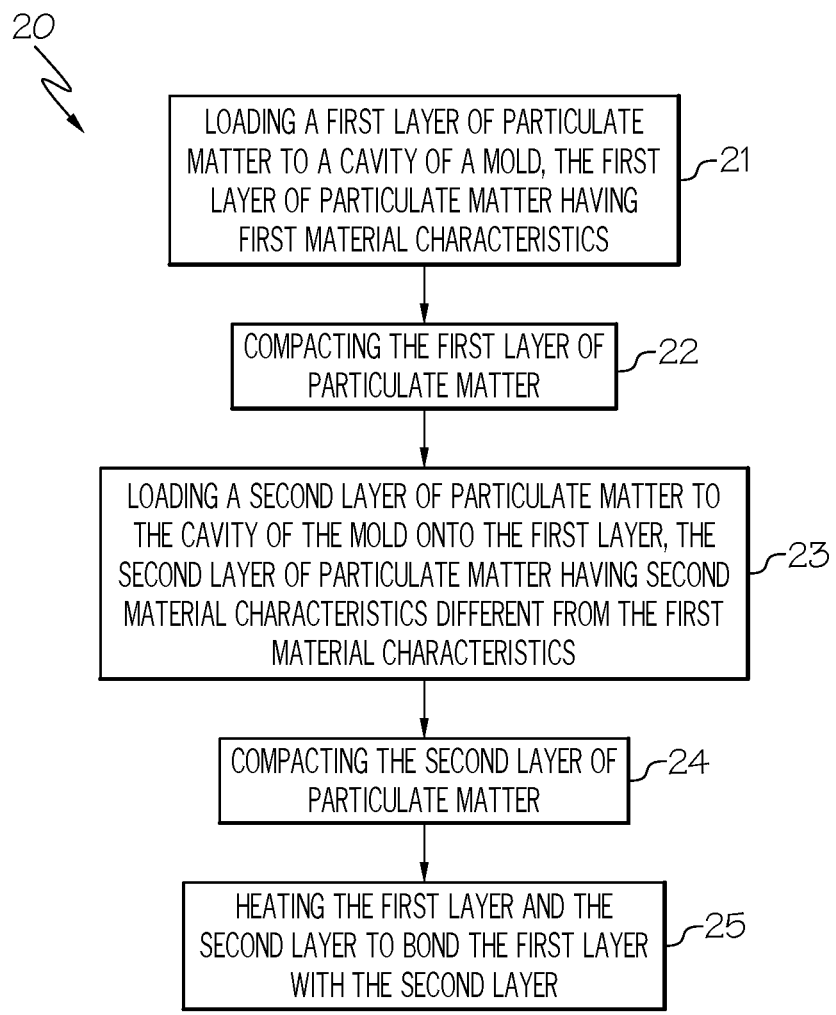
FIG. 2 is a flow diagram representing a first example of a method for manufacturing a component having a spatially graded property.

As shown in FIG. 2, block 20 represents a first example of a method for manufacturing a component having a spatially graded property. As represented by block 21, the method includes loading a first layer of particulate matter to a cavity of a mold, the first layer of particulate matter having first material characteristics. As represented by block 22, the method further includes compacting the first layer of particulate matter. As represented by block 23, the method further includes loading a second layer of particulate matter to the cavity of the mold onto the first layer, the second layer of particulate matter having second material characteristics different from the first material characteristics. As represented by block 24, the method further includes compacting the second layer. As represented by block 25, the method further includes heating the first layer and the second layer to bond the first layer with the second layer. In an aspect, the compacting of either or both of the first and second layers may include cold compacting to provide a green compact or hot compacting to provide a partly or fully consolidated compact. In another aspect, the method may be automatized by adding the layers of particulate matter by an automatic powder dispenser and compacting each layer before applying a next layer of particulate matter.

The above-described method may further include any number of additional layers of particulate matter having additional material characteristics the same as or different from the material characteristics of any preceding layer of particulate matter. Each additional layer of particulate matter may be loaded to the cavity of the mold onto a preceding layer and compacted. The first, second, and additional layers may be heated to bond each additional layer of particulate matter with its preceding layer of particulate matter. The above-described method may further include additional steps before, in between, or subsequent to the above-described steps.

Figure 3A:
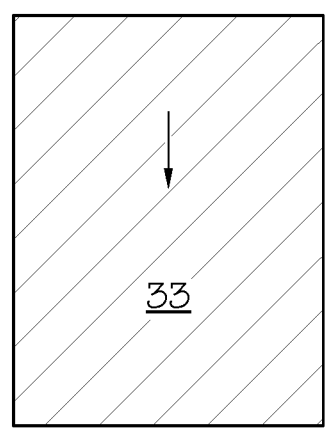
FIGS. 3A-3C illustrate an example of a method according to FIG. 2.
Figure 3A:
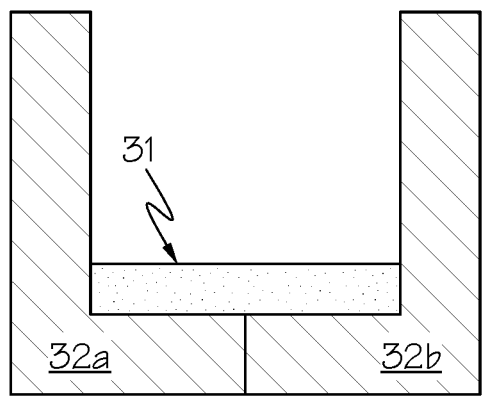
Figure 3B:
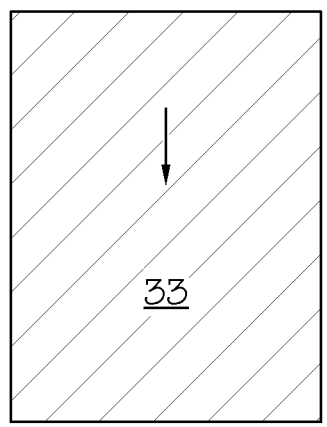
Figure 3B:
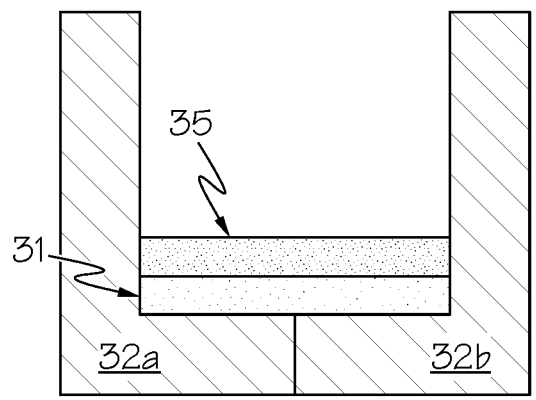
Figure 3C:
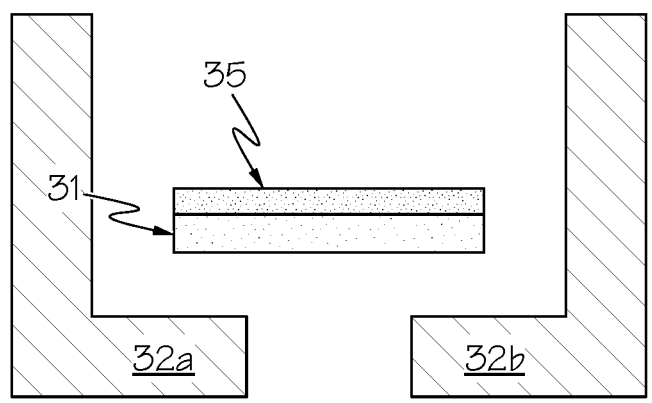

FIGS. 3A, 3B and 3C illustrate a non-limiting example of a method according to FIG. 2. As shown in FIG. 3A, a first layer of particulate matter 31 is loaded to a cavity of a mold 32a, 32b, and the first layer of particulate matter 31 is compacted by a die 33. As shown in FIG. 3B, a second layer of particulate matter 35 is loaded to the cavity of the mold 32a, 32b onto the first layer 31, and the second layer 35 is compacted by the die 33. As shown in FIG. 3C, the first layer 31 and second layer 35 may be removed from the mold 32a, 32b and thereafter heated to bond the first layer with the second layer.

Figure 4:
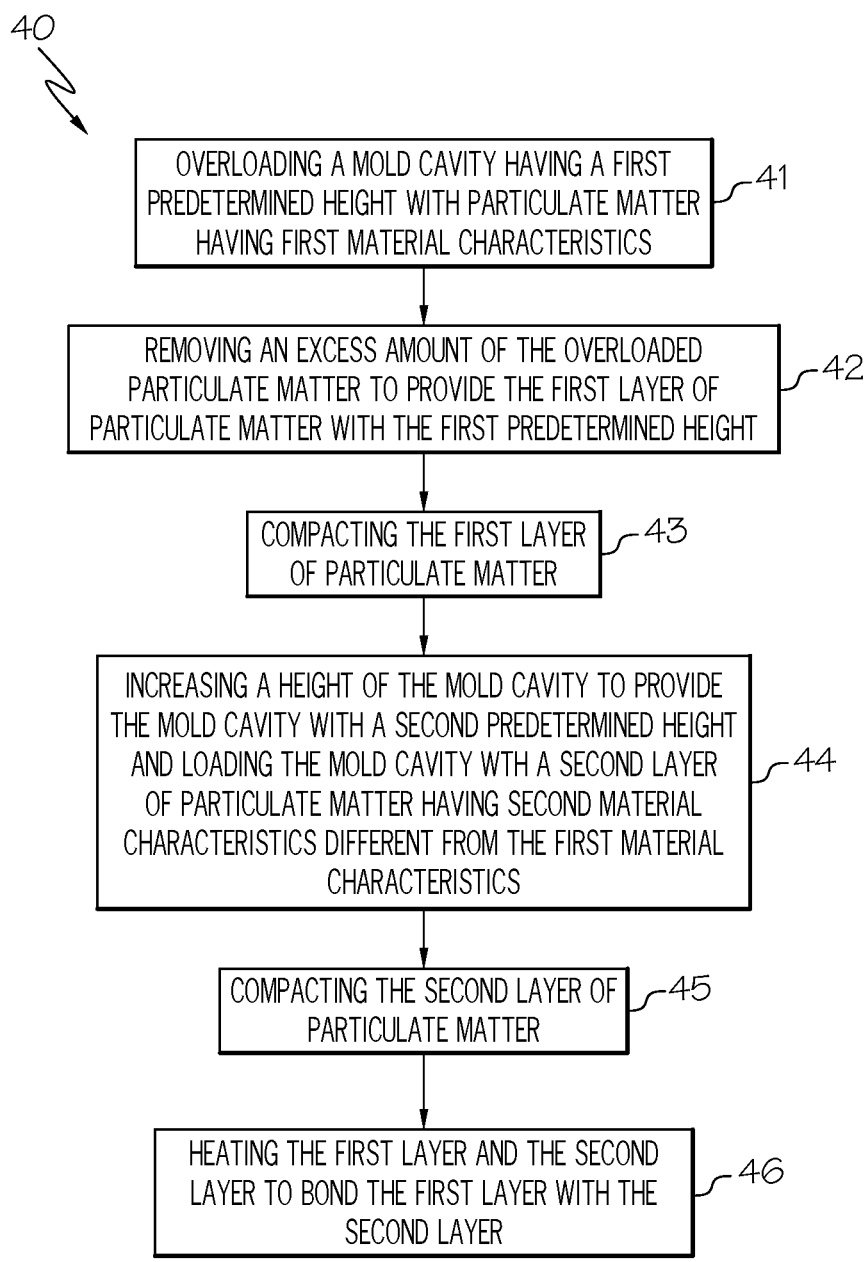
FIG. 4 is a flow diagram representing a second example of a method for manufacturing a component having a spatially graded property.

As shown in FIG. 4, block 40 represents a second example of a method for manufacturing a component having a spatially graded property. Compared to the first example of the present description, a feature of the second example includes increased control over an interface between the first layer and the second layer.

As represented by block 41, the method includes overloading a mold cavity having a first predetermined height with particulate matter having first material characteristics. As represented by block 42, the method further includes removing an excess amount of the overloaded particulate matter to provide the first layer of particulate matter with the first predetermined height. As represented by block 43, the method further includes compacting the first layer of particulate matter. As represented by block 44, the method further includes increasing a height of the mold cavity to provide the mold cavity with a second predetermined height and loading the mold cavity with a second layer of particulate matter having second material characteristics different from the first material characteristics. As represented by block 45, the method further includes compacting the second layer of particulate matter. As represented by block 46, the method further includes heating the first layer and the second layer to bond the first layer with the second layer. Block 44 may include overloading the mold cavity with the second layer of particulate matter and removing an excess amount of the overloaded second layer of particulate matter to provide the second layer of particulate matter with the second predetermined height. It will be understood that the second predetermined height of the mold cavity may be a distance between a top of the mold cavity and a top of the first layer of particulate matter after compacting. The method may further include repeating the respective steps for a third layer of particulate matter having third material characteristics different from the first and second material characteristics. The method may further include any number of additional layers of particulate matter added according to the same manner. The above-described method may further include additional steps before, in between, or subsequent to the above-described steps. The first, second, and any additional layers may be heated to bond each additional layer of particulate matter with its preceding layer of particulate matter. The above-described method may further include additional steps before, in between, or subsequent to the above-described steps.

In an example, the compacting of the first layer, the compacting of the second layer or both the compacting of the first layer and the compacting of the second layer may include cold compacting to provide a green compact or hot compacting to provide a partly or fully consolidated compact. In an example, the compacting of the first layer, the compacting of the second layer or both the compacting of the first layer and the compacting of the second layer may include cold compacting to provide a green compact or hot compacting to provide a partly or fully consolidated compact.

Figure 5A:
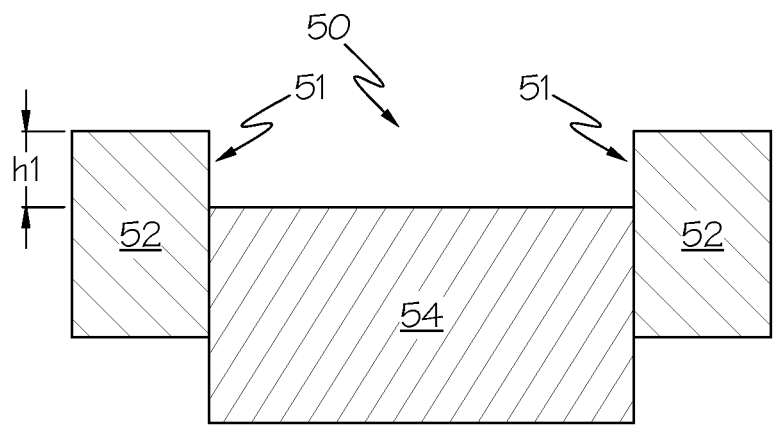
FIGS. 5A-5D illustrate an example of a method according to FIG. 4.
Figure 5B:
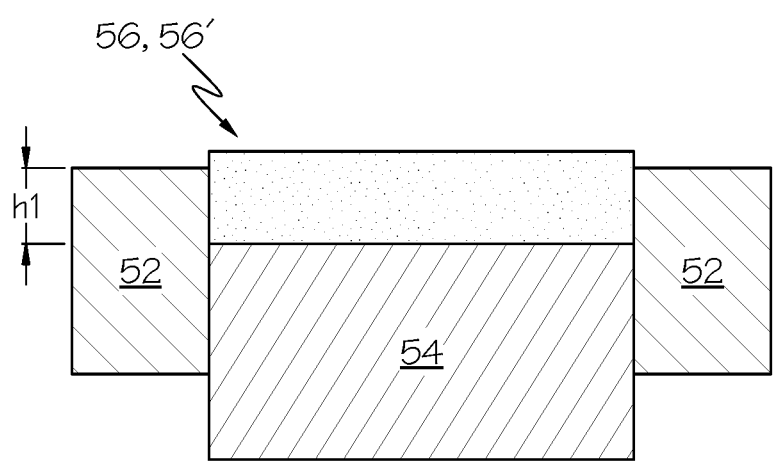
Figure 5C:
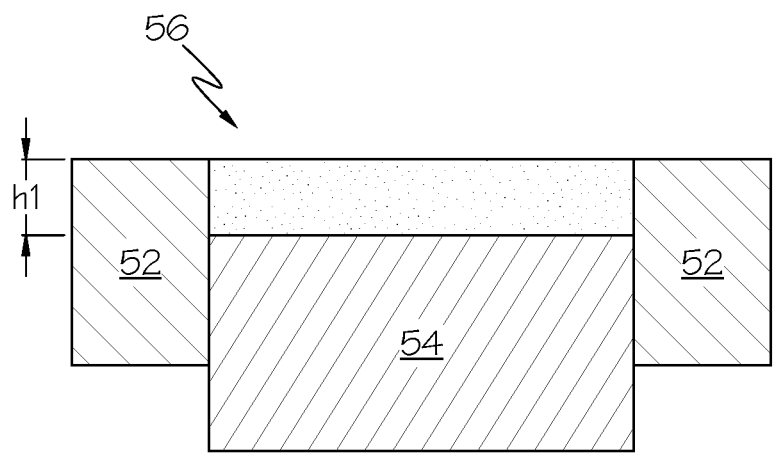
Figure 5D:
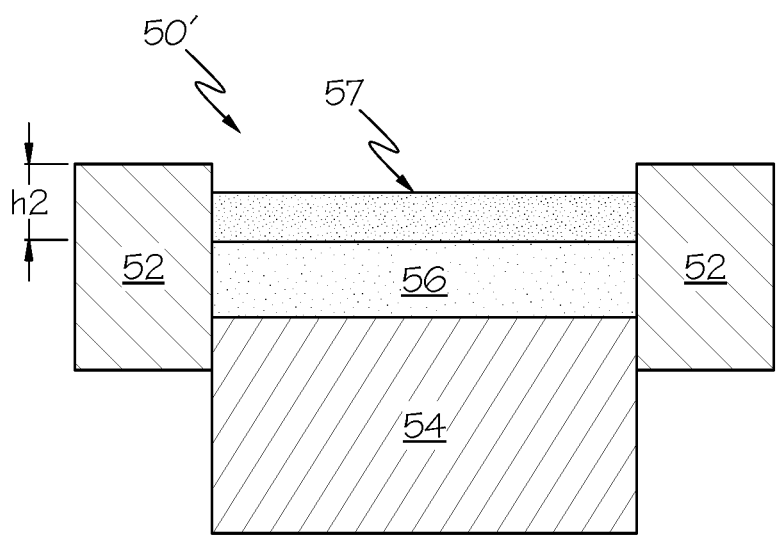

FIGS. 5A, 5B, 5C and 5D illustrate a non-limiting example of the method of FIG. 4. As shown in FIG. 5A, an interior cavity 50 may be defined by interior sidewalls 51 of a mold 52 (e.g. hollow cylindrical mold) and an upper surface 53 of a lower die 54 displaced a height h1 from an upper surface 55 of the mold 52. As shown in FIG. 5B, a first layer of particulate matter 56, 56' may be overloaded above an upper surface 55 of the mold 52. As shown in FIG. 5C, an excess amount 56' of the first layer of particulate matter may be removed from above the upper surface 55 of the mold 52 to provide a first layer of particulate matter 56, which may be thereafter compacted. As shown in FIG. 5D, the lower die 54 may be displaced downwardly relative to the mold 52 to provide an interior cavity 50' having an increased height h2, and a second layer of particulate matter 57 may be loaded onto the first layer 56, followed by compacting and heating. Accordingly, a position of an interface between the first layer and the second layer may be better controlled. In another non-limiting example, the lower die 54 may remain stationary relative to the mold 52 and another mold may be added above the first mold 52 to increase a height of the interior cavity (not shown).

Various additional examples of the present description include providing an interlayer between layers of particulate matter, such as between a first layer of particulate matter having first material characteristics and a second layer of particulate matter having second material characteristics different from the first material characteristics, between a second layer of particulate matter having second material characteristics and a third layer of particulate matter having third material characteristics different from the first and second material characteristics, or between fourth or additional layers of particulate matter having material characteristics different from material characteristics of preceding materials. The interlayer functions to separate layers of particulate matter, to permit a bonding of the separated layers upon heating, or to improve control of a shape of the interface between separated layers.

In one aspect, the interlayer may include an interlayer that intervenes between adjacent layers of particulate matter, such as an interlayer foil. In another aspect, the interface may be a combination of an interface between layers of particulate matter in direct contact with each other and an interlayer that intervenes between adjacent layers of particulate matter, such as an interlayer mesh. The interlayer may be flat or with simple to complex shape. In a specific example, interlayer may be formed by coating a layer of particulate matter (compacted or uncompacted) prior to the heating step. In an aspect, an interlayer, e.g. interlayer foil, interlayer mesh, interlayer coating, etc., may itself have a spatial distribution of materials characteristics, such as a spatial distribution of composition within the interlayer. When an interlayer is present, the heating is sufficient to bond together the layers separated by the interlayer. In this case, the bonding of the separated layers may include, for example, a solid state bonding between the interlayer to one or both of the separated layers, a solid state bonding between the separated layers, or combinations thereof.

Material characteristics of the interlayer are not limited and may depend upon a number of factors, such as application requirements, material characteristics of the layers of particulate matter, configuration of the preform, or the bonding and consolidating of the layers of particulate matter. Material characteristics of the interlayer may include, for example, composition, microstructure, phase distribution, and porosity.

A composition of the interlayer is not limited and may depend upon a number of factors, such as the factors listed above. A composition of the interlayer consists of one or more components. Likewise, compositions of the layers of particulate matter separated by the interlayer each consist of one or more components. In one aspect, the composition of the interlayer may comprise one or more components in common with the one or both of the compositions of the layers of particulate matter separated by the interlayer. In another aspect, the interlayer may consist or consist essentially of one or more components in common with the one or both of the compositions of the layers of particulate matter separated by the interlayer. A composition of the interlayer may include, for example, metal, alloy, intermetallic, ceramic compositions, polymer compositions or mixtures thereof. In a specific example, the interlayer may have a composition equal to or intermediate to the compositions of the layers of particulate matter separated by the interlayer.

In a specific example, a first layer of particulate matter may include titanium or titanium alloy, a second layer of particulate matter may include titanium diboride (TiB2), and the interlayer separating the first layer of particulate matter from the second layer of particulate matter may include titanium or titanium alloy.

A shape of the interlayer is not limited. The interlayer may be a pre-fabricated structure that is positioned between layers of particulate matter, or the interlayer may be fabricated at the position at which the interlayer will separate the layers of particulate matter. In an example, the interlayer may include an interlayer foil an interlayer mesh. In another example, the interlayer may be formed by coating a layer of particulate matter (compacted or uncompacted) prior to the heating step. In yet another example, the interlayer may be fabricated as part of a mold.

A thickness of the interlayer is not limited and may include any thickness that separates the first layer of particulate matter from the second layer of particulate matter. In a non-limiting example, a thickness of the interlayer may be 500 mil or less. In another non-limiting example, a thickness of the interlayer may be 100 mil or less. In yet another non-limiting example, a thickness of the interlayer may be 10 mil or less. In yet another non-limiting example, a thickness of the interlayer may be 1 mil or less.

As previously indicated, the interlayer may function to separate layers of particulate matter, to permit a bonding of the separated layers upon heating, or to improve control of a shape of the interface. The bonding of the separated layers may include, for example, a solid state bonding between the interlayer to one or both of the separated layers, a solid state bonding between the separated layers, or combinations thereof. This may include, for example, heating at a time and temperature sufficient to diffusively mix the separated layers, such as a bonding a first layer of particulate matter with a second layer of particulate matter. In an example, the heating may be sufficient to diffusively mix the first layer of particulate matter with the interlayer. In another example, the heating may be sufficient to diffusively mix the first layer of particulate matter with the interlayer and to diffusively mix the second layer of particulate matter with the interlayer. In yet another example, the heating may be sufficient to diffusively mix the first layer with the second layer through the interlayer. A time and temperature of the heating of the layers may depend upon the above-described degree of diffusive mixing and the characteristics of the interlayer, such as composition, shape, and thickness.

Figure 6:
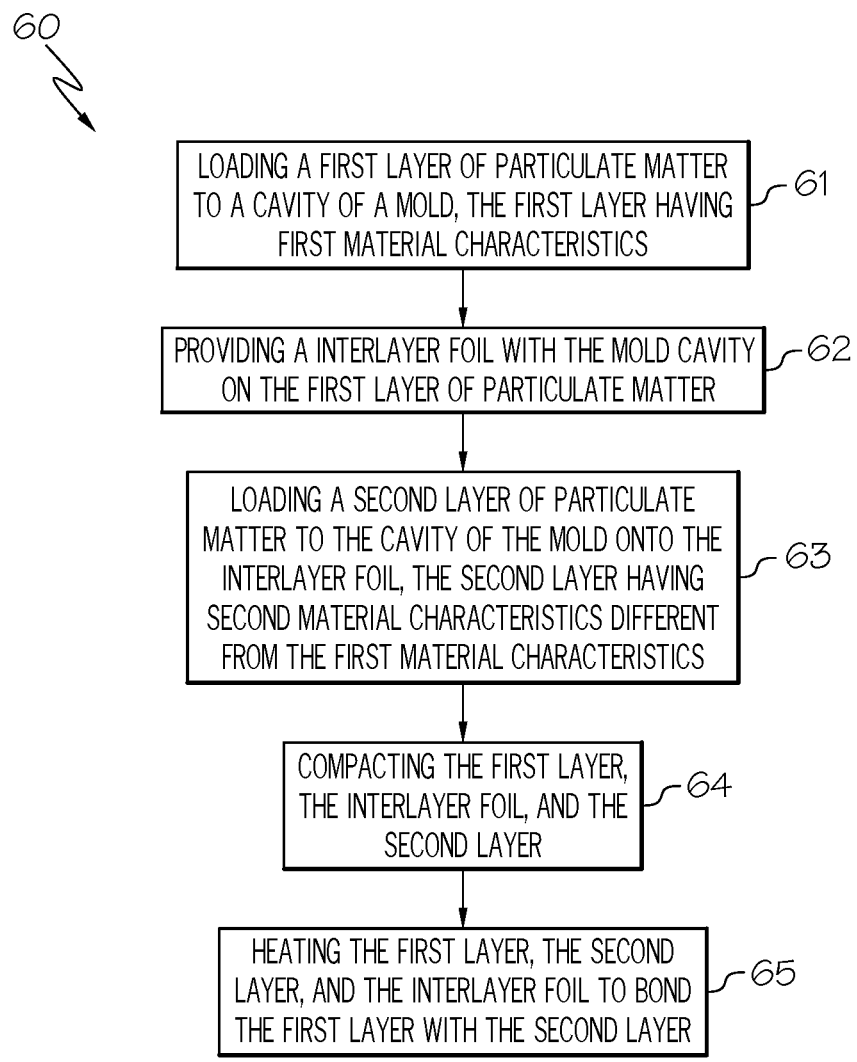
FIG. 6 is a flow diagram representing a third example of a method for manufacturing a component having a spatially graded property.

As shown in FIG. 6, block 60 represents a third example of a method for manufacturing a component having a spatially graded property. As represented by block 61, the method includes loading a first layer of particulate matter to a cavity of a mold, the first layer having first material characteristics. As represented by block 62, the method further includes providing an interlayer foil within the mold cavity on the first layer of particulate matter. As represented by block 63, the method further includes loading a second layer of particulate matter to the cavity of the mold onto the interlayer foil, the second layer having second material characteristics different from the first material characteristics. As represented by block 64, the method further includes compacting the first layer, the interlayer foil, and the second layer. As represented by block 65, the method further includes heating the first layer, the second layer, and the interlayer foil to bond the first layer with the second layer. In an example, the compacting may include cold compacting to provide a green compact or hot compacting to provide a partly or fully consolidated compact. In another example, the compacting may occur during the heating of the first layer, the second layer, and the interlayer foil to bond the first layer with the second layer.

Material characteristics of the interlayer foil are not limited and may depend upon a number of factors, such as application requirements, material characteristics of the layers of particulate matter, configuration of the preform, or the bonding and consolidating of the layers of particulate matter. Material characteristics of the interlayer foil may include, for example, composition, microstructure, phase distribution, and porosity.

A composition of the interlayer foil is not limited and may depend upon a number of factors, such as the factors listed above. A composition of the interlayer foil consists of one or more components. Likewise, compositions of the layers of particulate matter separated by the interlayer foil each consist of one or more components. In one aspect, the composition of the interlayer foil may comprise one or more components in common with the one or both of the compositions of the layers of particulate matter separated by the interlayer foil. In another aspect, the interlayer foil may consist or consist essentially of one or more components in common with the one or both of the compositions of the layers of particulate matter separated by the interlayer foil. A composition of the interlayer foil may include, for example, metal, alloy, intermetallic, ceramic compositions, polymer compositions or mixtures thereof. In a specific example, the interlayer foil may have a composition equal to or intermediate to the compositions of the layers of particulate matter separated by the interlayer foil.

In one aspect, the heating of the first layer of particulate matter, the second layer of particulate matter, and the interlayer foil may be sufficient to diffuse the entire interlayer foil into the first layer, the second layer, or both the first and second layers. In another aspect, the heating of the layers of particulate matter and the interlayer foil may be sufficient to diffuse a portion of the interlayer foil into the layers of particulate matter while a remainder of the interlayer foil is undiffused and solid between the layers.

The above-described method may further include providing a second interlayer foil within the mold cavity on the second layer of particulate matter and loading a third layer of particulate matter to the cavity of the mold onto the second interlayer foil, the third layer having third material characteristics different from the first and second material characteristics, and may further provide any number of additional layers of particulate matter having additional material characteristics different from preceding material characteristics and being loaded to the cavity of the mold onto interlayer foils provided on the preceding layers. The above-described method may further include additional steps before, in between, or subsequent to the above-described steps.

Figure 7A:
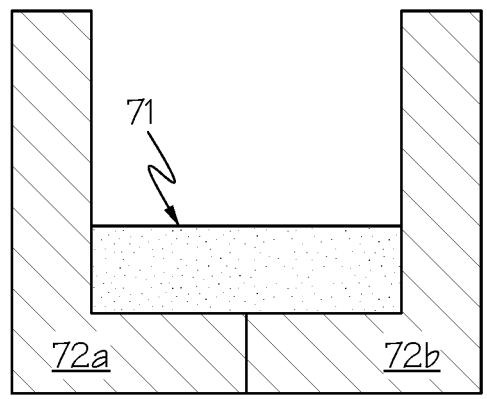
FIGS. 7A-7C illustrate an example of a method according to FIG. 6.
Figure 7B:
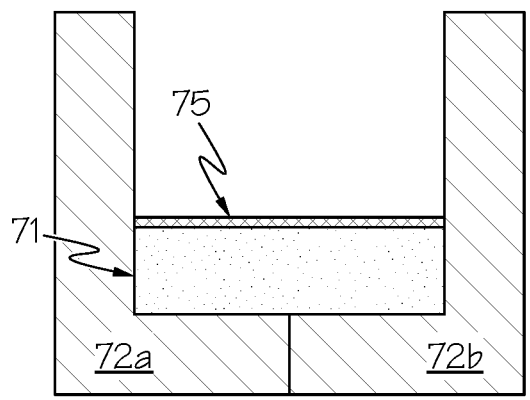
Figure 7C:
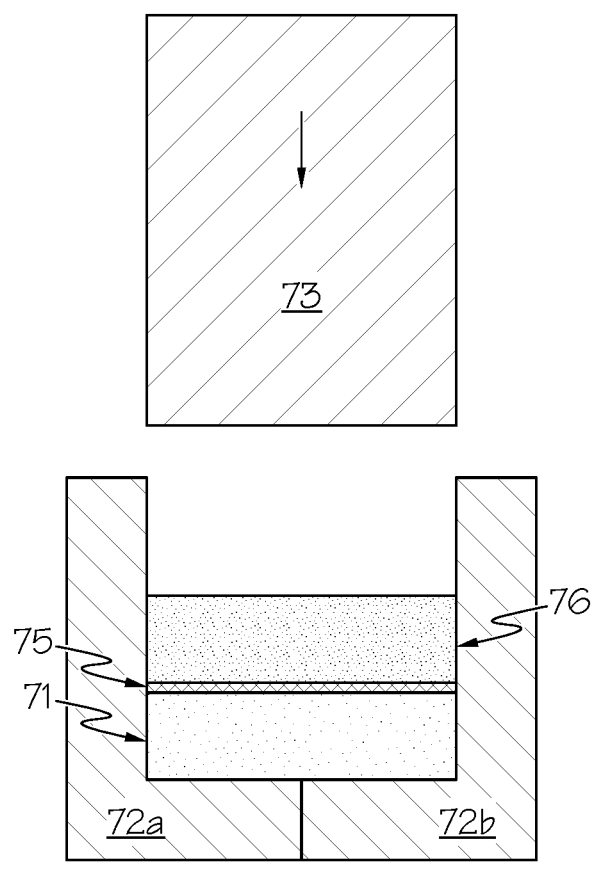

FIGS. 7A, 7B and 7C illustrate a non-limiting example of a method according to FIG. 6. As shown in FIG. 7A, a first layer 71 of particulate matter is loaded to a cavity of a mold 72a, 72b. As shown in FIG. 7B, an interlayer foil 75 is provided to the cavity of the mold 72a, 72b onto the first layer 71. As shown in FIG. 7C, a second layer 76 is provided to the cavity of the mold 72a, 72b onto the interlayer foil 75, and thereafter compacted by the die 73 and heated to bond the first layer with the second layer.

Figure 8:
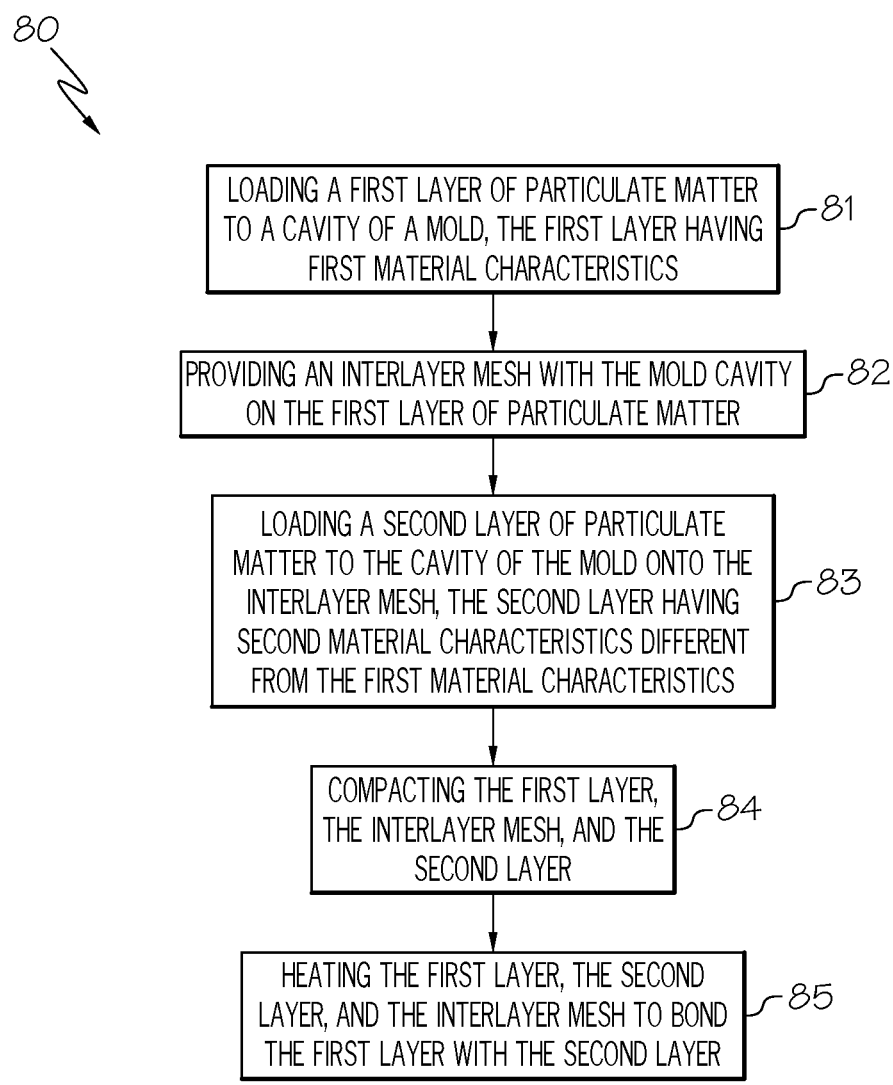
FIG. 8 is a flow diagram representing a fourth example of a method for manufacturing a component having a spatially graded property.

As shown in FIG. 8, block 80 represents a fourth example of a method for manufacturing a component having a spatially graded property. As represented by block 81, the method includes loading a first layer of particulate matter to a cavity of a mold, the first layer having first material characteristics. As represented by block 82, the method further includes providing an interlayer mesh within the mold cavity on the first layer. As represented by block 83, the method further includes loading a second layer of particulate matter to the cavity of the mold onto the interlayer mesh, the second layer having second material characteristics different from the first material characteristics. As represented by block 84, the method further includes compacting the first layer, the interlayer mesh, and the second layer. As represented by block 105, the method further includes heating the first layer, the layer material, and the interlayer mesh to bond the first layer with the second layer. In an example, the compacting may include cold compacting to provide a green compact or hot compacting to provide a partly or fully consolidated compact. In another example, the compacting may occur during the heating of the first layer, the second layer, and the interlayer mesh to bond the first layer with the second layer.

Material characteristics of the interlayer mesh are not limited and may depend upon a number of factors, such as application requirements, material characteristics of the layers of particulate matter, configuration of the preform, or the bonding and consolidating of the layers of particulate matter. Material characteristics of the interlayer mesh may include, for example, composition, microstructure, phase distribution, and porosity.

A composition of the interlayer mesh is not limited and may depend upon a number of factors, such as the factors listed above. A composition of the interlayer mesh consists of one or more components. Likewise, compositions of the layers of particulate matter separated by the interlayer mesh each consist of one or more components. In one aspect, the composition of the interlayer mesh may comprise one or more components in common with the one or both of the compositions of the layers of particulate matter separated by the interlayer mesh. In another aspect, the interlayer mesh may consist or consist essentially of one or more components in common with the one or both of the compositions of the layers of particulate matter separated by the interlayer mesh. A composition of the interlayer mesh may include, for example, metal, alloy, intermetallic, ceramic compositions, polymer compositions or mixtures thereof. In a specific example, the interlayer mesh may have a composition equal to or intermediate to the compositions of the layers of particulate matter separated by the interlayer mesh.

In one aspect, the heating of the first layer of particulate matter, the second layer of particulate matter, and the interlayer mesh may be sufficient to diffuse the entire interlayer mesh into the first layer, the second layer, or both the first and second layers. In another aspect, the heating of the layers of particulate matter and the interlayer mesh may be sufficient to diffuse a portion of the interlayer mesh into the layers of particulate matter while a remainder of the interlayer mesh is undiffused and solid between the layers.

The above-described method may further include providing a second interlayer mesh within the mold cavity on the second layer of particulate matter and loading a third layer of particulate matter to the cavity of the mold onto the second interlayer mesh, the third layer having third material characteristics different from the first and second material characteristics, and may further provide any number of additional layers of particulate matter having additional material characteristics different from preceding material characteristics and being loaded to the cavity of the mold onto interlayer meshes provided on the preceding layers. The above-described method may further include additional steps before, in between, or subsequent to the above-described steps.

In an example, the interlayer mesh may have openings therein that a smaller than a size of the separated layers of particulate matter. In another example, the interlayer mesh may have a composition different from the layers of particulate matter separated by the interlayer mesh. In one aspect, the interlayer mesh may remain substantially unchanged as a result of the heating of the first layer, the second layer, and the interlayer mesh. Rather, the first layer and second layer may bond through openings in the interlayer mesh.

Figure 9A:
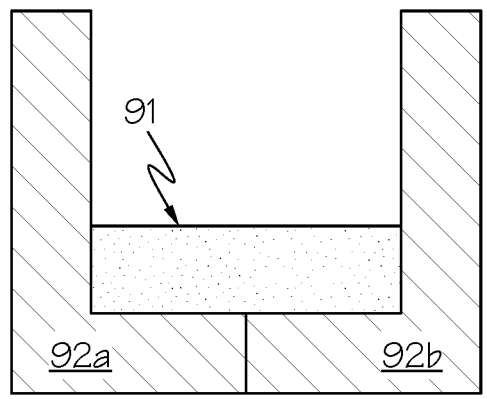
FIGS. 9A-9C illustrate an example of a method according to FIG. 8.
Figure 9B:
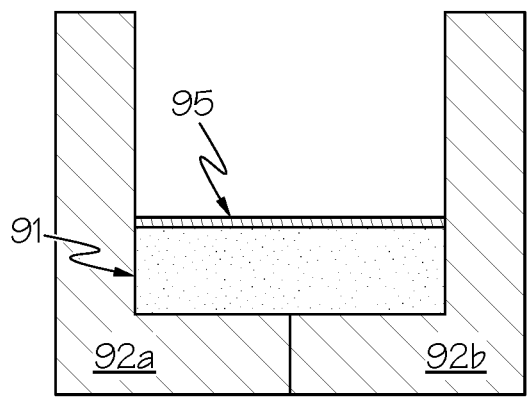
Figure 9C:
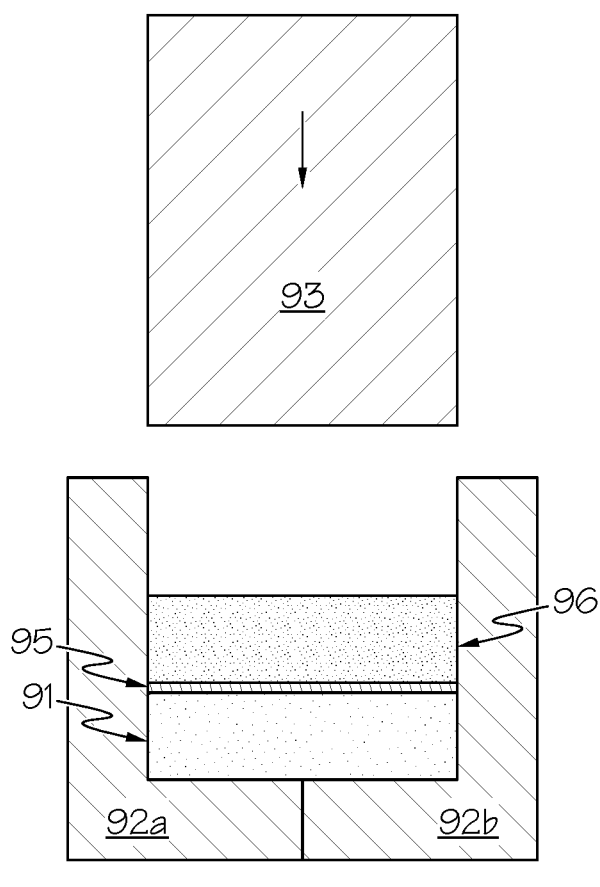
Figure 10:
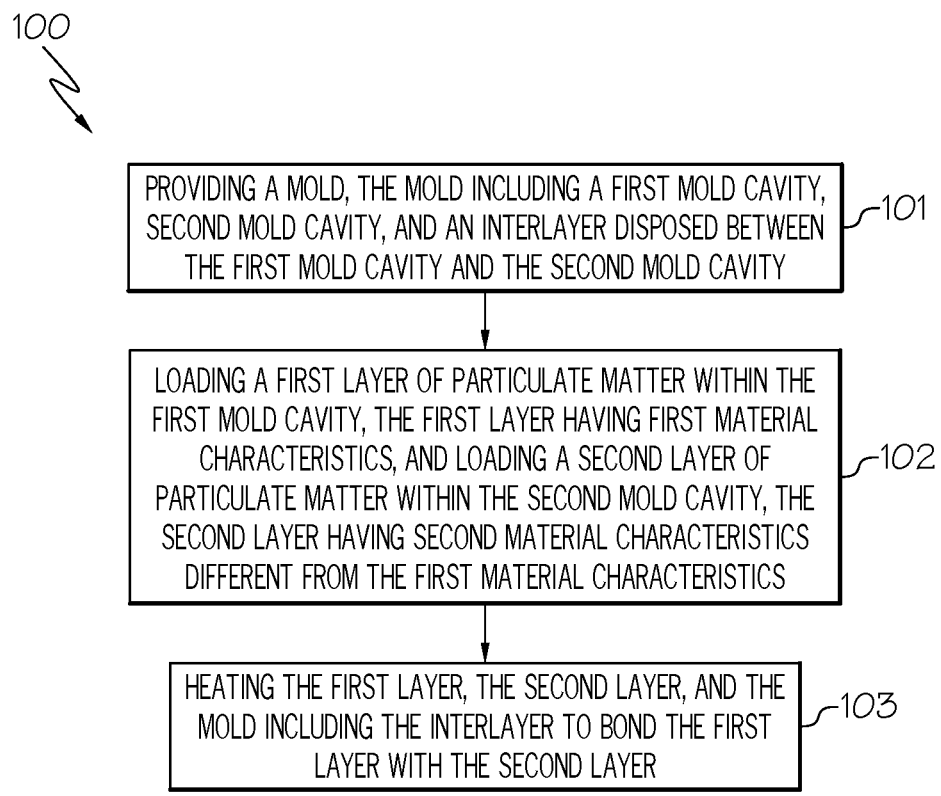
FIG. 10 is a flow diagram representing a fifth example of a method for manufacturing a component having a spatially graded property.

FIGS. 9A, 9B and 9C illustrate a non-limiting example of a method according to FIG. 10. As shown in FIG. 9A, a first layer 91 of particulate matter is loaded to a cavity of a mold 92a, 92b. As shown in FIG. 9B, an interlayer mesh 95 is provided to the cavity of the mold 92a, 92b onto the first layer 91. As shown in FIG. 9C, a second layer 96 is provided to the cavity of the mold 92a, 92b onto the 95, and thereafter compacted by the die 93 and heated to bond the first layer with the second layer.

As shown in FIG. 10, block 100 represents a fifth example of a method for manufacturing a component having a spatially graded property. As represented by block 101, the method includes providing a mold, the mold including a first mold cavity, a second mold cavity, and an interlayer disposed between the first mold cavity and the second mold cavity. As represented by block 102, the method further includes loading a first layer of particulate matter within the first mold cavity, the first layer having first material characteristics, and loading a second layer of particulate matter within the second mold cavity, the second layer having second material characteristics different from the first material characteristics. As represented by block 103, the method further includes heating the first layer, the second layer, and the mold including the interlayer to bond the first layer with the second layer. The mold may be formed by, for example, additive manufacturing.

The above-described method may further include providing a third mold cavity and a second interlayer disposed between the second mold cavity and the third mold cavity, and a third layer of particulate matter within the third mold cavity, the third layer having third material characteristics different from the first and second material characteristics. The above-described method may further include providing any number of additional mold cavities with interlayers disposed between the additional mold cavity and any preceding mold cavity and with an additional layer of particulate matter within each additional mold cavity. The above-described method may further include additional steps before, in between, or subsequent to the above-described steps.

In an example, the interlayer may have a composition equal to or intermediate to the compositions of the layers of particulate matter separated by the interlayer. In another example, the interlayer may include an interlayer foil or an interlayer mesh.

In one aspect, the heating of the layers of particulate matter and the mold including the interlayer may be sufficient to diffuse the entire interlayer into the layers of particulate matter. In another aspect, portions of the mold other than the interlayer may bond with the layers of particulate matter. In yet another aspect, the heating of the layers of particulate matter and the interlayer may be sufficient to diffuse the entire interlayer into the layers of particulate matter. In yet another aspect, the heating of the layers of particulate matter and the interlayer may be sufficient to diffuse a portion of the interlayer into the layers of particulate matter while a remainder of the interlayer is undiffused and solid between the layers.

Figure 11:
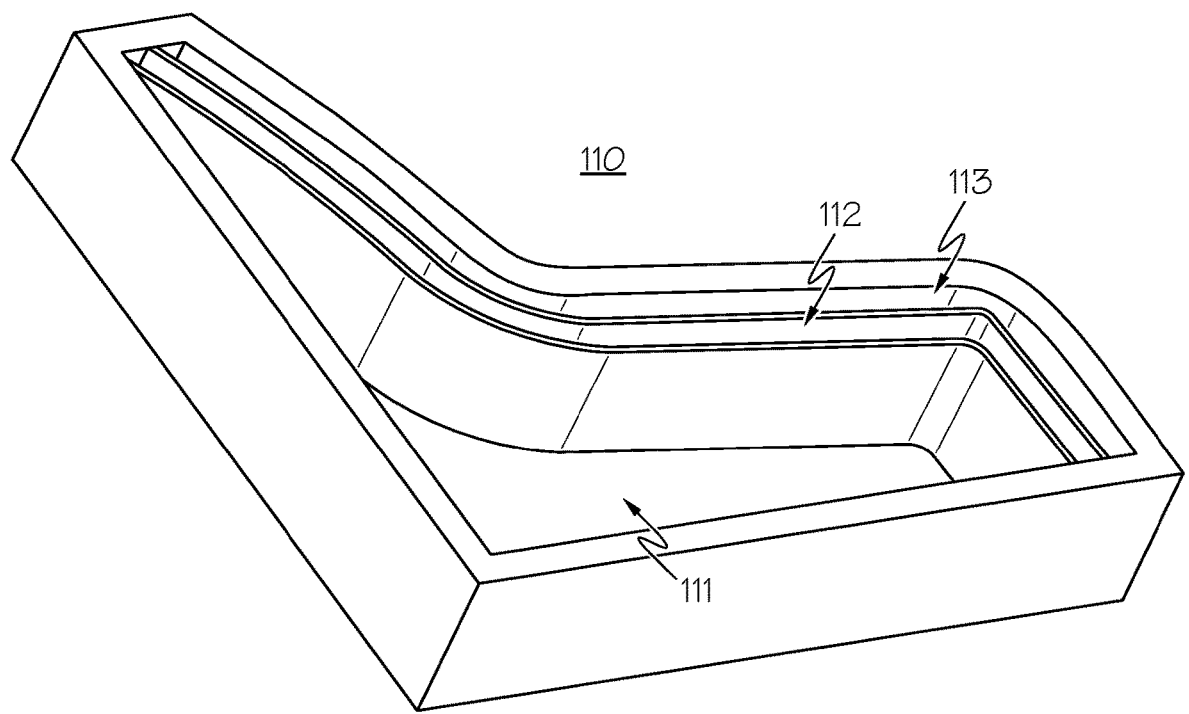
FIG. 11 illustrates an example of a method according to FIG. 10.

FIG. 11 illustrates an exemplary mold 110, in which a first layer of particulate matter may be loaded within a first mold cavity 111, a second layer of particulate matter may be loaded within a second mold cavity 112, and a third layer of particulate matter may be loaded with a third mold cavity 113. The exemplary mold 110 may be heated to bond the first layer in the first mold cavity 111 with the second layer in the second mold cavity 112 and to bond the second layer in the second mold cavity 112 with the third layer in the third mold cavity 113. The mold may be formed by, for example, additive manufacturing.

Figure 12:
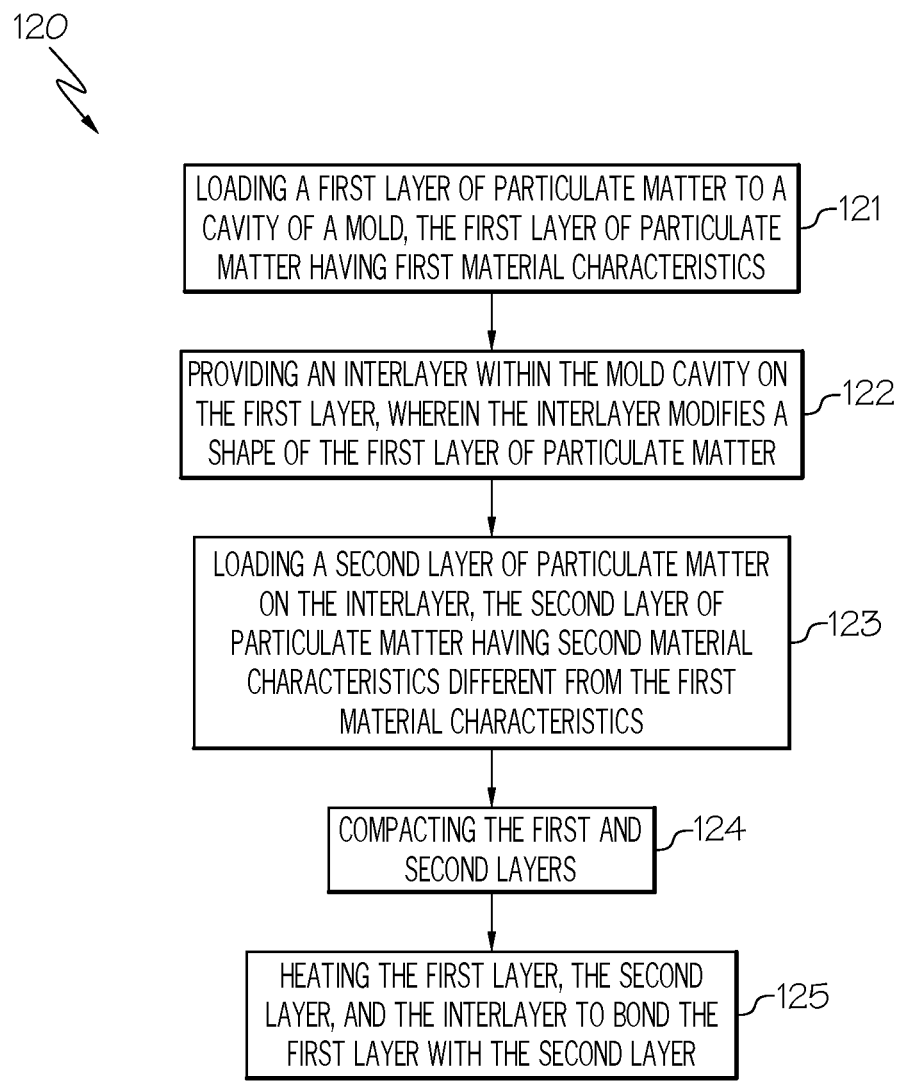
FIG. 12 is a flow diagram representing a seventh example of a method for manufacturing a component having a spatially graded property.

As shown in FIG. 12, block 120 represents a sixth example of a method for manufacturing a component having a spatially graded property, in which a layer of particulate matter is shaped using an interlayer. As represented by block 121, the method includes loading a first layer of particulate matter to a cavity of a mold, the first layer having first material characteristics. As represented by block 122, the method further includes providing an interlayer within the mold cavity on the first layer, wherein the interlayer modifies a shape of the first layer of particulate matter. As represented by block 123, the method further includes loading a second layer of particulate matter on the interlayer, the second layer having second material characteristics different from the first material characteristics. As represented by block 124, the method further includes compacting the first and second layer. As represented by block 125, the method further includes heating the first layer, the second layer, and the interlayer to bond the first layer with the second layer. In an example, the compacting may include cold compacting to provide a green compact or hot compacting to provide a partly or fully consolidated compact. In another example, the compacting may occur during the heating of the first layer, the second layer, and the interlayer to bond the first layer with the second layer.

The above-described method may further include providing a second interlayer within the mold cavity on the second layer of particulate matter, wherein second interlayer modifies a shape of the second layer of particulate matter. The method may include a third or any number of additional layers of particulate matter having additional material characteristics different from preceding material characteristics and being loaded to the cavity of the mold onto interlayers provided in the same manner. The second interlayer may modify the shape of the second layer of particulate matter to have the same shape or different shape as the first interlayer modifies the shape of the first layer of particulate matter. The above-described method may further include additional steps before, in between, or subsequent to the above-described steps.

The interlayers may modify the shape of the underlying layers of particulate matter by, for example, providing the interlayer within the mold cavity onto the layer of particulate matter and then compacting the interlayer using a die having a desired surface geometry or by producing the interlayer to have a desired geometry and then compacting the interlayer onto the underlying layers of particulate matter.

Figure 13A:
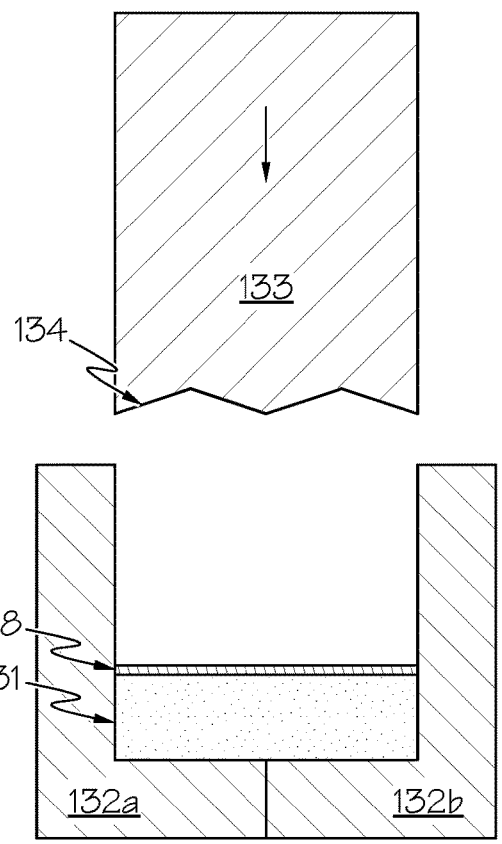
FIGS. 13A-13C illustrate an example of a method according to FIG. 12.
Figure 13B:
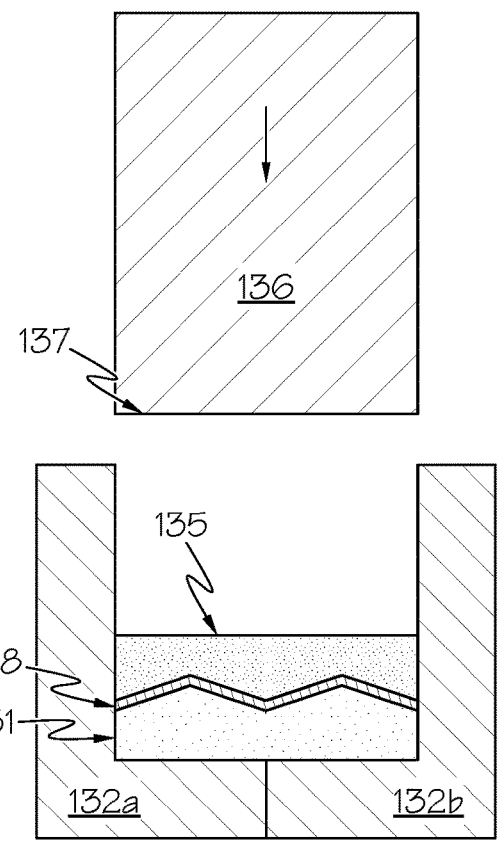
Figure 13C:
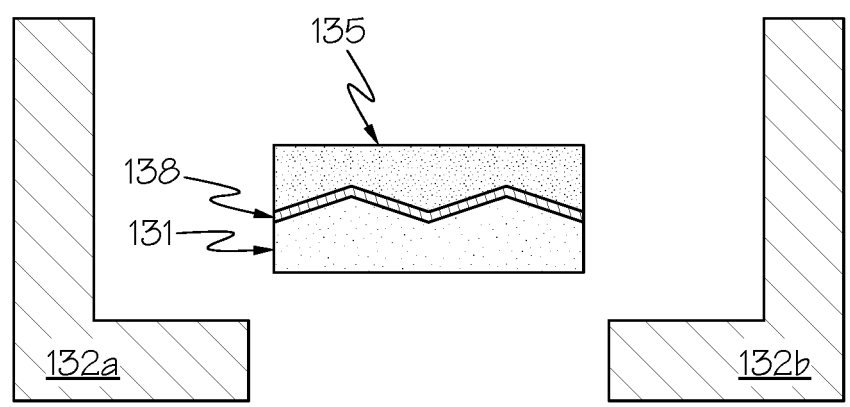

FIGS. 13A, 13B and 13C illustrate a non-limiting example of a method according to FIG. 12. As shown in FIG. 13A, a first layer 131 of particulate matter is loaded to a cavity of a mold 132a, 132b, and an interlayer 138 is provided within the cavity of the mold 132a, 132b onto the first layer 131. The first layer 131 and the interlayer 138 are then compacted by a first die 133 having a first surface geometry 134. As shown in FIG. 13B, a second layer 135 of particulate matter is loaded to the cavity of the mold 132a, 132b onto the interlayer 138, and the second layer 135 is compacted by a second die 136 having a second surface geometry 137 different from the first surface geometry 134. As shown in FIG. 13C, the first layer 131, the interlayer 138, and the second layer 135 may be removed from the mold 132a, 132b and thereafter may be heated to bond the first layer with the second layer. As a result, the first layer 131 may have a shape that is modified by the interlayer 138 to have, for example, a variable thickness.

Figure 14:
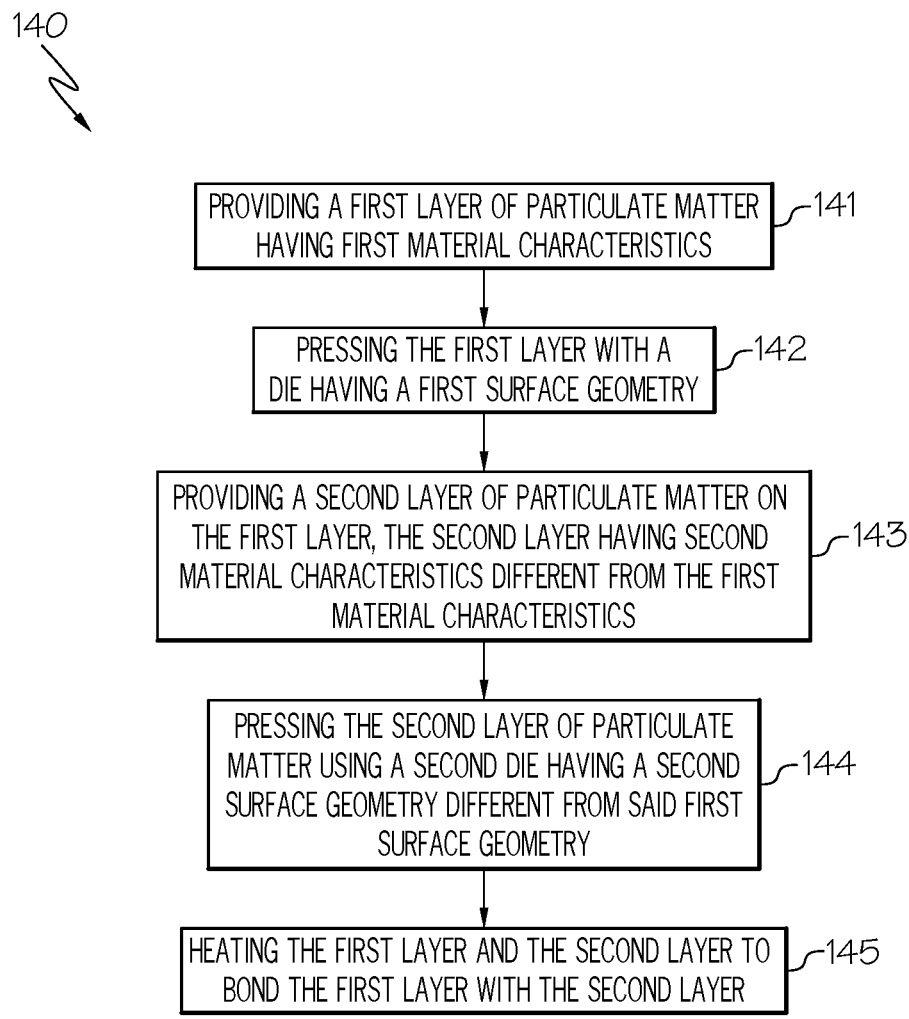
FIG. 14 is a flow diagram representing an eighth example of a method for manufacturing a component having a spatially graded property.

As shown in FIG. 14, block 140 represents a seventh example of a method for manufacturing a component having a spatially graded property. Compared to the first and second examples of the present description, a feature of the third example includes increased control over a shape of an interface and a thickness variation of layers.

As represented by block 141, the method includes providing a first layer of particulate matter, the first layer having first material characteristics. As represented by block 142, the method further includes compacting the first layer with a die having a first surface geometry. As represented by block 143, the method further includes providing a second layer of particulate matter on the first layer, the second layer having second material characteristics different from the first material characteristics. As represented by block 144, the method further includes compacting the second layer of particulate matter using a second die having a second surface geometry different from the first surface geometry. As represented by block 145, the method further includes heating the first layer and the second layer to bond the first layer with the second layer. In an example, the compacting of the first layer, the compacting of the second layer or both the compacting of the first layer and the compacting of the second layer may include cold compacting to provide a green compact or hot compacting to provide a partly or fully consolidated compact. In an aspect, the method may be automatized by adding a layer of powder by an automatic powder dispenser and compacting each layer before applying a next layer.

The above-described method may further include any number of additional layers of particulate matter having additional material characteristics different from preceding material characteristics and being loaded to the cavity of the mold onto the preceding material, compacted, and heated to bond the additional material with the preceding material. The compacting of the additional layers of particulate matter may use a previously used die or another die having another surface geometry different from the surface geometries of the previously used dies. The above-described method may further include additional steps before, in between, or subsequent to the above-described steps.

Figure 15A:
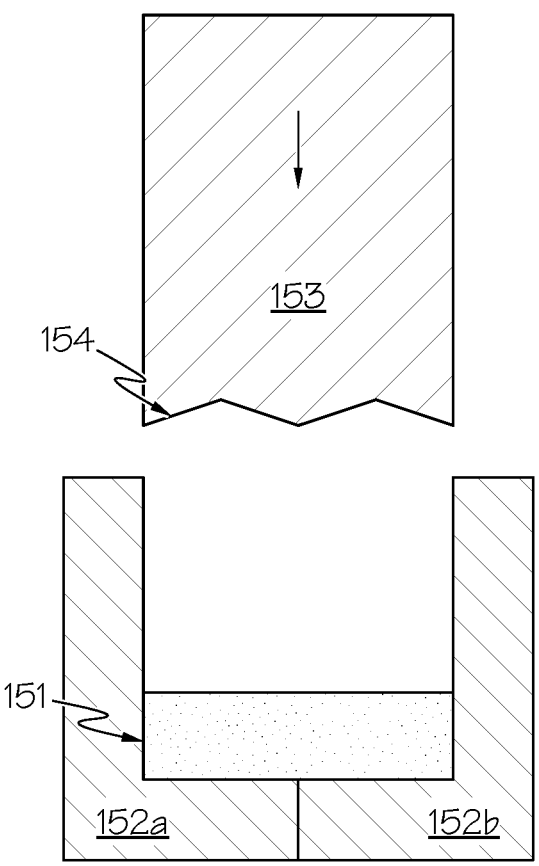
FIGS. 15A-15C illustrate an example of a method according to FIG. 14.
Figure 15B:
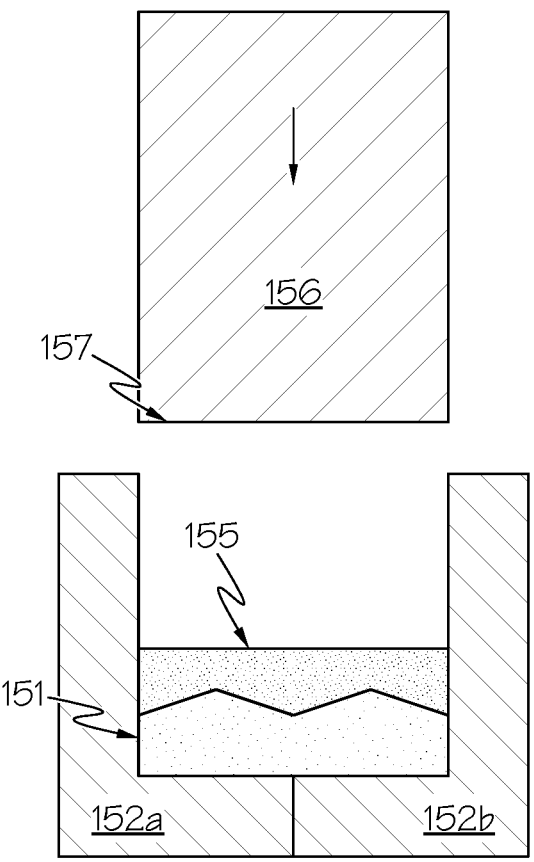
Figure 15C:
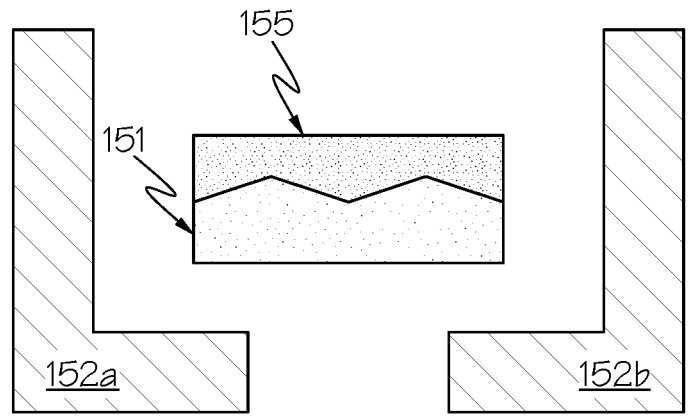

FIGS. 15A, 15B and 15C illustrate a non-limiting example of a method according to FIG. 14. As shown in FIG. 15A, a first layer 151 of particulate matter is loaded to a cavity of a mold 152a, 152b, and the first layer 151 is compacted by a first die 153 having a first surface geometry 154. As shown in FIG. 15B, a second layer 155 of particulate matter is loaded to the cavity of the mold 152a, 152b onto the first layer 151, and the second layer 155 is compacted by a second die 156 having a second surface geometry 157 different from the first surface geometry 154. As shown in FIG. 15C, the first layer 151 and second layer 155 may be removed from the mold 152a, 152b and thereafter may be heated to bond the first layer with the second layer. As a result, the first layer 151 may have a shape that is modified to have, for example, a variable thickness.

Figure 16:
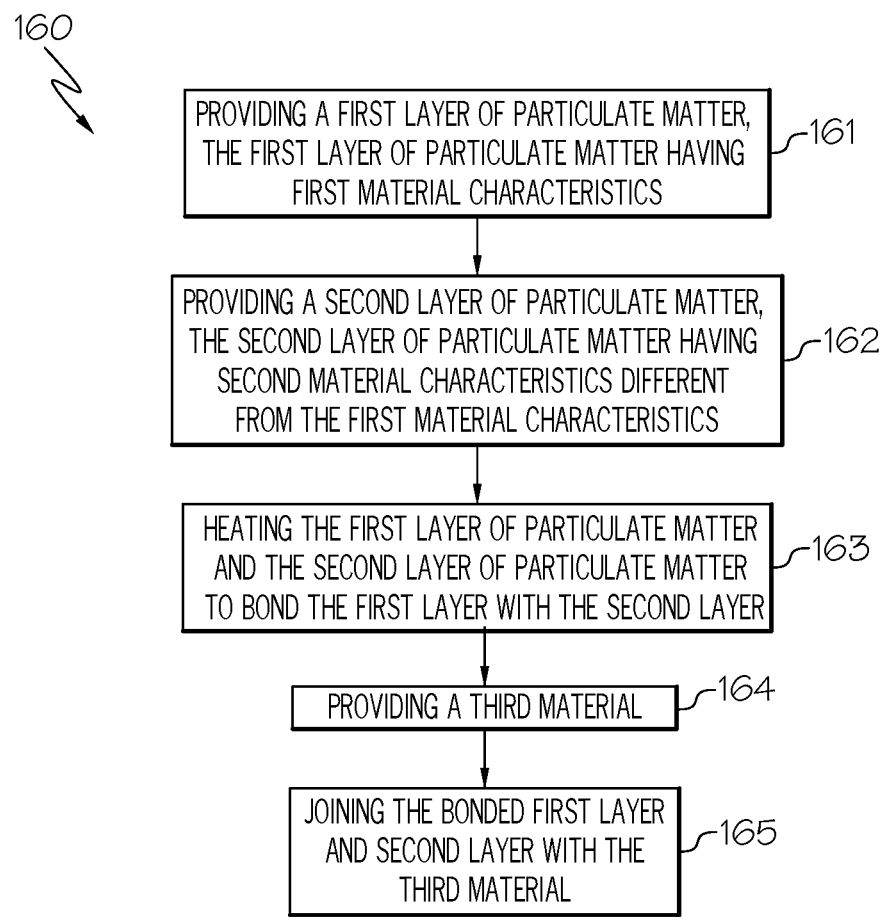
FIG. 16 is a flow diagram representing a ninth example of a method for manufacturing a component having a spatially graded property.

As shown in FIG. 16, block 160 represents an eighth example of a method for manufacturing a component having a spatially graded property by joining a previously bonded material having a spatially graded property with one or more other materials.

As represented by block 161, the method includes providing a first layer of particulate matter, the first layer of particulate matter having first material characteristics. As represented by block 162, the method further includes providing a second layer of particulate matter, the second layer of particulate matter having second material characteristics different from the first material characteristics. As represented by block 163, the method further includes heating the first layer of particulate matter and the second layer of particulate matter to bond the first layer with the second layer. As represented by block 164, the method further includes providing a third material. As represented by block 165, the method further includes joining the bonded first layer and second layer with the third material. The steps represented by blocks 161 through 163 for providing and heating the first and second layers are not further limited and may include any of the previously described methods for manufacturing components having spatially graded properties. In an example, the steps represented by blocks 161 through 163 for providing and heating the first and second layers to bond the first layer with the second layer may be performed, for example, in accordance with any of the first through seventh examples of the present description. The above-described method may further include additional materials having additional material characteristics bonded with the first and second layers of particulate matter or may include additional materials joined with the third material. The above-described method may further include additional steps before, in between, or subsequent to the above-described steps.

The method for manufacturing a component having a spatially graded property by joining a previously bonded material having a spatially graded property with a third material has a capability to further expand a range of materials that may be combined together in a component having a spatially graded property.

In an example showing the capability of further expanding a range of materials that may be combined, there is a first layer of particulate matter having a processing temperature of between T1min and T1max, a second layer of particulate matter having a processing temperature of between T2min and T2max, and a third material having a processing temperature of between T3min and T3max, wherein the processing temperature of T1min to T1 max is compatible with the processing temperature of T2min to T2max, which is compatible with the processing temperature of T3min to T3max, but the processing temperature of T1min to T1max is incompatible with the processing temperature of T3min to T3max, such as T1min is greater than T3max or T1max is less than T3min. The minimum temperatures T1min, T2min, and T3min may represent, for example, a minimum temperature sufficient for the layer of particulate matter to bond within a given processing time or a minimum temperature sufficient to consolidate the respective layer. The maximum temperatures T1max, T2max, T3max may represent, for example, a melting temperature of the respective materials. Therefore, materials T1 and T3 cannot be processed at the same temperature. However, according to the eighth example, materials T1 and T2 can be made into a preform according to one of the first through seventh examples and heated to bond the first material with the second material, and then the third material may be joined thereto.

In an example showing the capability of further expanding a range of materials that may be combined, the third material may be porous foam, and T3max may be a temperature above which the porous structure of the foam would be compromised. In a specific example, a TiB/Ti metal matrix composite having a compositional gradient formed according to the steps of blocks 161 to 163 may be joined with a closed pore Ti foam. The TiB/Ti metal matrix composite may synthesized at a high temperature that would compromise the porous structure of the Ti foam, and thereafter the closed pore Ti foam may be joined with the TiB/Ti metal matrix composite at a low temperature that would be insufficient for synthesizing the TiB/Ti metal matrix composite. The joining step may include, for example, diffusion bonding.

Also, two preforms may be joined together to further expand a range of materials that may be combined. For example, a first layer of particulate matter having first material characteristics and a second layer of particulate matter having second material characteristics different from the first material characteristics may be heated at a first time and second temperature sufficient to bond the first layer with the second layer. A third layer of particulate matter having third material characteristics and a fourth layer of particulate matter having fourth material characteristics different from the third material characteristics may be heated at a second time and second temperature sufficient to bond the third layer with the fourth layer. The first and second layers may be made into a preform according to one of the first through seventh examples, and the third and fourth layers may be made into a preform according to the same or different one of the first through seventh examples. Then the bonded first and second layers may be joined with the bonded third and fourth layers. The method may further include additional material having additional material characteristics bonded with the third and fourth layers of particulate matter. The method may further include additional steps before, in between, or subsequent to the above-described steps.

In an example showing the capability of further expanding a range of materials that may be combined, first layer of particulate matter may have a processing temperature of between T1min and T1 max, a second layer of particulate matter may have a processing temperature of between T2min and T2max, a third layer of particulate matter may have a processing temperature of between T3min and T3max, and a fourth layer of particulate matter may have a processing temperature of between T4min and T4 max, wherein the processing temperature of T1min to T1 max is compatible with the processing temperature of T2min to T2max, which is compatible with the processing temperature of T3min to T3max, which is compatible with the processing temperature of T4min to T4max, but the processing temperature of the first, second, third, and fourth layers of particulate matter are not all be compatible with each other. Accordingly, the first and second layers of particulate matter may be heated at a first temperature to bond the first and second layers, the third and fourth layers of particulate matter may be heated at a second temperature to bond the third and fourth materials, and the second and third materials may be joined at a third temperature to bond the second and third materials. Thus, the first temperature of heating may be above the maximum processing temperature of the third or fourth materials or below the minimum processing temperature of the third or fourth materials, or the second temperature of heating may be above the maximum processing temperatures of the first or second layers or below the minimum processing temperatures of the first or second layers, and the temperature of joining may be an intermediate temperature between the first and second temperatures.

Any of the above-described first through eighth examples may be further modified by introducing a non-particulate material. The non-particulate material may include, for example, a ceramic rod or a metallic alloy having a predetermined shape that is introduced, for example, within or adjacent to the layers of particulate matter prior to heating to bond the materials. In another aspect, the non-particulate material may be provided by an additive manufacturing process, such as thermal spray, cold spray, laser deposition, in which the additive manufacturing process is used before, during, or after heating to bond the materials.

Any of the above-described examples may be further modified by shaping a layer provided according to any of the previously discussed examples, either with or without prior compacting, optionally providing an interlayer on the shaped layer, and then continuing to provide one or more additional layers of particulate matter thereon. Accordingly, the method may include providing one or more layers of particulate matter according to any of the previously discussed examples, optionally compacting and/or consolidating the one or more layers, followed by shaping of at least one layer, such as by machining the layer, by melting the layer, or by welding the layer. The shaped provided to the first layer may include any shape or pattern to provide the desired spatially graded properties. The method may further optionally provide an interlayer on the shaped layer of particulate matter. Then, the method may continue with providing one or more additional layers of particulate matter thereon according to any of the previously discussed examples, or the method may directly proceed with heating to bond the layers.

Any of the above-described examples may be further modified by incorporating brazing, diffusion bonding and other solid or semisolid state joining methods, such as inertia friction welding.

Applications may include thermal protections systems, engine inner wall lining, armor, hypersonic skins, gears, and actuators.

Figure 17:
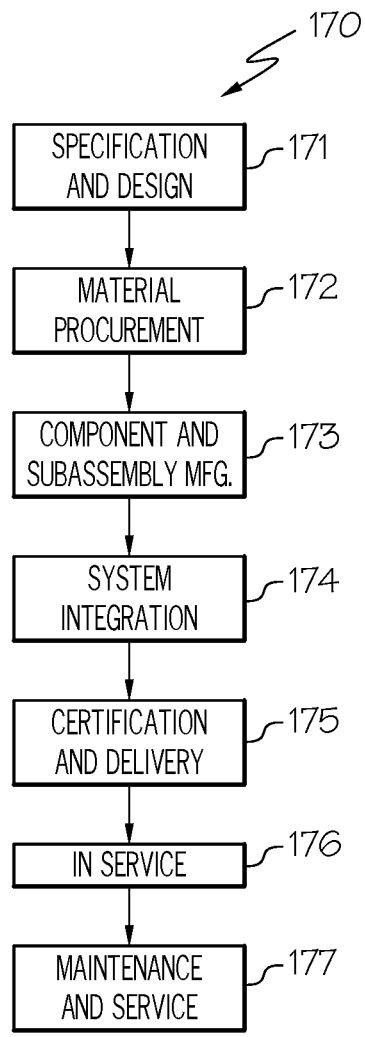
FIG. 17 is a flow diagram of an aircraft manufacturing and service methodology.
Figure 18:
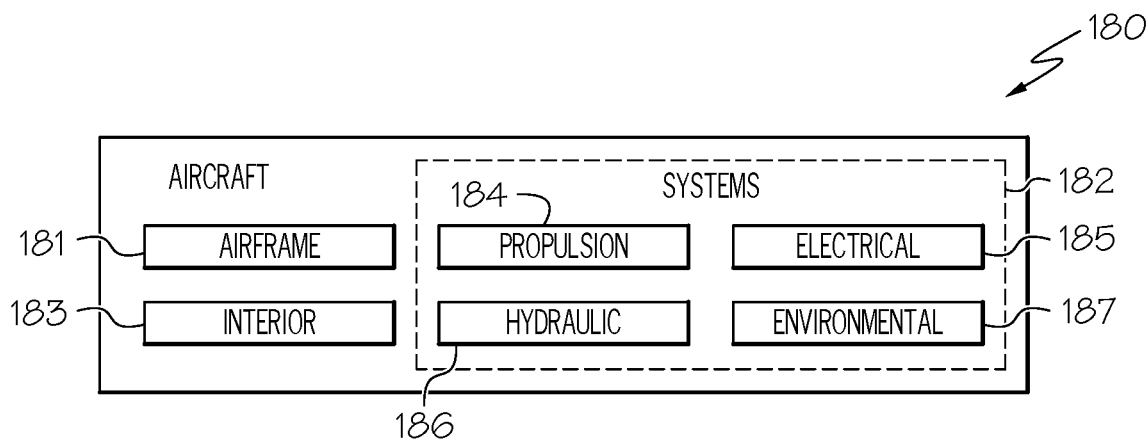
FIG. 18 is a block diagram of an aircraft.

Examples of the present disclosure may be described in the context of an aircraft manufacturing and service method 170 as shown in FIG. 17 and an aircraft 180 as shown in FIG. 18. During pre-production, the illustrative method 170 may include specification and design, as shown at block 171, of the aircraft 180 and material procurement, as shown at block 172. During production, component and subassembly manufacturing, as shown at block 173, and system integration, as shown at block 174, of the aircraft 180 may take place. Thereafter, the aircraft 180 may go through certification and delivery, as shown block 175, to be placed in service, as shown at block 176. While in service, the aircraft 180 may be scheduled for routine maintenance and service, as shown at block 177. Routine maintenance and service may include modification, reconfiguration, refurbishment, etc. of one or more systems of the aircraft 180.

Each of the processes of illustrative method 170 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 18, the aircraft 180 produced by illustrative method 170 (FIG. 17) may include airframe 181 with a plurality of high-level systems 182 and interior 183. Examples of high-level systems 182 may include one or more of propulsion system 184, electrical system 185, hydraulic system 186, and environmental system 187. Any number of other systems may be included. Although an aerospace example is shown, the principles disclosed herein may be applied to other industries, such as the automotive and marine industries. Accordingly, in addition to the aircraft 180, the principles disclosed herein may apply to other vehicles (e.g., land vehicles, marine vehicles, space vehicles, etc.).

The disclosed methods for manufacturing components having spatially graded properties may be employed during any one or more of the stages of the manufacturing and service method 170. For example, components or subassemblies corresponding to component and subassembly manufacturing (block 173) may be fabricated or manufactured using the disclosed methods. Also, the methods may be utilized during production stages (blocks 173 and 174), for example, by substantially expediting assembly of or reducing the cost of aircraft 180. Similarly, the disclosed methods may be utilized, for example and without limitation, while aircraft 180 is in service (block 176) and/or during the maintenance and service stage (block 177).

Although various examples of the disclosed methods for manufacturing components having spatially graded properties have been shown and described, modifications may occur to those skilled in the art upon reading the specification. The present application includes such modifications and is limited only by the scope of the claims.

What is claimed is:

1. A method for manufacturing a component having a spatially graded property, the method comprising:
    providing a first layer of particulate matter, said first layer of particulate matter having first material characteristics;
    providing a second layer of particulate matter, said second layer having second material characteristics different from said first material characteristics;
    providing a third layer of particulate matter, said third layer having third material characteristics different from said first and second material characteristics;
    providing a first non-particulate interlayer between said first layer of particulate matter and said second layer of particulate matter;
    providing a second non-particulate interlayer between said second layer of particulate matter and said third layer of particulate matter; and
    heating said first layer, said second layer, said third layer, said first interlayer and said second interlayer to bond said first layer with said second layer and to bond said second layer with said third layer.

2. The method of claim 1 wherein providing said first layer of particulate matter includes loading said first layer of particulate matter within a mold cavity, wherein said interlayer is provided within said mold cavity on said first layer, and wherein providing said second layer of particulate matter includes loading said second layer within said mold cavity on said interlayer.

3. The method of claim 2 further comprising compacting said first layer of particulate matter and said second layer of particulate matter.

4. The method of claim 3 wherein said first layer is compacted before said second layer is compacted.

5. The method of claim 3 wherein said compacting is performed before said heating.

6. The method of claim 3 wherein said compacting is performed during said heating.

7. The method of claim 2 wherein said interlayer includes an interlayer foil.

8. The method of claim 7 wherein a composition of said interlayer foil comprises one or more components in common with compositions of one or both of said first layer and said second layer.

9. The method of claim 2 wherein said interlayer includes an interlayer mesh.

10. The method of claim 9 wherein a composition of said interlayer mesh comprises one or more components in common with compositions of one or both of said first layer and said second layer.

11. A method for manufacturing a component having a spatially graded property, the method comprising:

providing a mold, said mold including a first mold cavity, a second mold cavity, and an interlayer disposed between said first mold cavity and said second mold cavity;

loading a first layer of particulate matter in said first mold cavity, said first layer of particulate matter having first material characteristics;

loading a second layer of particulate matter in said second mold cavity, said second layer having second material characteristics different from said first material characteristics; and heating said first layer, said second layer, and said interlayer to bond said first layer with said second layer.

12. The method of claim 11 wherein said mold is formed by additive manufacturing.

13. The method of claim 1 wherein providing said first layer of particulate matter includes loading said first layer of particulate matter within a mold cavity, wherein said interlayer is provided within said mold cavity on said first layer of particulate matter, and wherein said interlayer provided on said first layer of particulate matter modifies a shape of said first layer of particulate matter.

14. The method of claim 13 wherein said modified shape of said first layer of particulate matter has a variable thickness.

15. The method of claim 13 wherein said interlayer is an interlayer foil.

16. The method of claim 13 wherein said interlayer is an interlayer mesh.

17. A method for manufacturing a component having a spatially graded property, the method comprising:

providing a first layer of particulate matter, said first layer having first material characteristics;

shaping said first layer to provide a non-flat surface geometry to the first layer of particulate matter;

providing a second layer of particulate matter, said second layer having second material characteristics different from said first material characteristics; and compacting said second layer of particulate matter.

18. The method of claim 17 wherein said shaping said first layer includes compacting the first layer of particulate matter using a first die having a first surface geometry, and wherein said compacting said second layer of particulate matter includes compacting using a second die having a second surface geometry different from said first surface geometry.

19. The method of claim 17 further comprising compacting said first layer of particulate matter before said shaping said first layer.

20. The method of claim 19 wherein shaping said first layer includes at least one of machining the first layer, melting the first layer, and welding the first layer.

21. The method of claim 17 further comprising providing an interlayer between said first layer and said second layer.

22. The method of claim 21 wherein said interlayer is an interlayer foil.

23. The method of claim 21 wherein said interlayer is an interlayer mesh.

24. A method for manufacturing a component having a spatially graded property, the method comprising:

providing a first layer of particulate matter, said first layer having first material characteristics;

providing a second layer of particulate matter on said first layer, said second layer of particulate matter having second material characteristics different from said first material characteristics;

heating said first layer and said second layer at a first temperature to bond said first layer with said second layer;

providing a third layer of particulate matter, said third layer having third material characteristics;

providing a fourth layer of particulate matter on said third layer, said fourth layer having fourth material characteristics different from said first, second, and third material characteristics;

heating said third layer and said fourth layer at a second temperature to bond said third layer with said fourth layer, wherein said second temperature is different than said first temperature; and joining said bonded first layer and second layer with said bonded third layer and fourth layer.

25. The method of claim 24 wherein said second temperature is above a melting point of at least one of said first layer and said second layer.

26. The method of claim 24 wherein said joining includes heating at a third temperature between said first temperature and said second temperature.

27. The method of claim 24 further comprising at least one of: providing an interlayer between said first layer and said second layer before said heating of said first layer and said second layer; and providing an interlayer between said third layer and said fourth layer before said heating of said third layer and said fourth layer.

28. The method of claim 24 further comprising compacting said first layer of particulate matter using a first die having a first surface geometry, and compacting said second layer of particulate matter using a second die having a second surface geometry different from said first surface geometry.

29. The method of claim 24 wherein said joining includes a solid or semisolid joining process.

30. The method of claim 29 wherein said joining includes at least one of brazing, diffusion bonding, and friction welding.

31. The method of claim 29 wherein said joining includes inertia friction welding.

32. A method for manufacturing a component having a spatially graded property, the method comprising:

providing a first layer of particulate matter, said first layer having first material characteristics;

providing a second layer of particulate matter on said first layer, said second layer having second material characteristics different from said first material characteristics;

providing a non-particulate material within said first layer of particulate matter or within said second layer of particulate matter; and heating said first layer, said second layer, and said non-particulate material to bond said first layer with said second layer.

33. The method of claim 32 wherein said non-particulate material is provided within a mold cavity before at least one of said first layer of particulate matter and said second layer of particulate matter are loaded within said mold cavity.

34. The method of claim 32 wherein said non-particulate material is provided within a mold cavity after at least one of said first layer of particulate matter and said second layer of particulate matter are loaded within said mold cavity.

35. The method of claim 32 wherein said non-particulate material is a rod.

36. The method of claim 32 wherein said non-particulate material is a ceramic rod.

37. The method of claim 32 wherein said non-particulate material is a metal or an alloy having a predetermined shape.

38. The method of claim 32 further comprising providing an interlayer between said first layer and said second layer.

39. The method of claim 32 further comprising compacting said first layer of particulate matter using a first die having a first surface geometry, and compacting said second layer of particulate matter using a second die having a second surface geometry different from said first surface geometry.

40. The method of claim 32 further comprising:
providing a third layer of particulate matter, said third layer having third material characteristics different from said first and second material characteristics;
providing a fourth layer of particulate matter on said third layer, said fourth layer having fourth material characteristics different from said first, second, and third material characteristics;
heating said third layer and said fourth layer at a second temperature to bond said third layer with said fourth layer; and
joining said bonded first layer and second layer with said bonded third layer and fourth layer.

41. The method of claim 32 wherein said non-particulate material is provided by an additive manufacturing process.

42. The method of claim 2 wherein said interlayer includes a coating on the first layer of particulate matter.

* * * * *